(12) United States Patent
Ando et al.

(10) Patent No.: US 10,174,190 B2
(45) Date of Patent: Jan. 8, 2019

(54) COMPOSITE PARTICLES, METHOD FOR PRODUCING COMPOSITE PARTICLES, AND USE THEREOF

(71) Applicant: Sekisui Plastics Co., Ltd., Osaka-shi (JP)

(72) Inventors: Mayumi Ando, Tenri (JP); Toshiki Takenaka, Koka (JP); Akiyoshi Kusaka, Tenri (JP); Takashi Goto, Koka (JP)

(73) Assignee: SEKISUI PLASTICS CO., LTD., Osaka (JP)

(*) Notice: Subject to any disclaimer, the term of this patent is extended or adjusted under 35 U.S.C. 154(b) by 36 days.

(21) Appl. No.: 15/306,223

(22) PCT Filed: Mar. 26, 2015

(86) PCT No.: PCT/JP2015/059418
§ 371 (c)(1),
(2) Date: Oct. 24, 2016

(87) PCT Pub. No.: WO2015/163083
PCT Pub. Date: Oct. 29, 2015

(65) Prior Publication Data
US 2017/0058116 A1    Mar. 2, 2017

(30) Foreign Application Priority Data
Apr. 25, 2014   (JP) .................. 2014-091668

(51) Int. Cl.
| | | |
|---|---|---|
| C08L 33/12 | (2006.01) |
| C08F 2/18 | (2006.01) |
| C09D 201/00 | (2006.01) |
| C08L 101/00 | (2006.01) |
| C08L 1/28 | (2006.01) |
| C09D 101/28 | (2006.01) |
| C09D 133/12 | (2006.01) |
| G02B 1/04 | (2006.01) |
| C08G 18/62 | (2006.01) |
| C08F 212/08 | (2006.01) |
| C08F 220/14 | (2006.01) |
| C08F 265/04 | (2006.01) |
| C08F 265/06 | (2006.01) |
| C09D 175/04 | (2006.01) |
| C09D 7/40 | (2018.01) |

(52) U.S. Cl.
CPC .............. *C08L 33/12* (2013.01); *C08F 2/18* (2013.01); *C08F 212/08* (2013.01); *C08F 220/14* (2013.01); *C08F 265/04* (2013.01); *C08F 265/06* (2013.01); *C08G 18/6225* (2013.01); *C08L 1/284* (2013.01); *C08L 101/00* (2013.01); *C09D 7/40* (2018.01); *C09D 101/284* (2013.01); *C09D 133/12* (2013.01); *C09D 175/04* (2013.01); *C09D 201/00* (2013.01); *G02B 1/04* (2013.01); *C08L 2205/025* (2013.01); *C08L 2205/03* (2013.01)

(58) Field of Classification Search
CPC ........ C08L 33/12; C08L 1/284; C08L 101/00; C08L 2205/03; C08L 2205/025; C09D 7/40; C09D 101/284; C09D 133/12; C09D 175/04; C09D 201/00; C08F 2/18; C08F 220/14; C08F 265/04; C08F 265/06; C08F 212/08; C08G 18/6225; G02B 1/04
See application file for complete search history.

(56) References Cited

U.S. PATENT DOCUMENTS 6,534,597 B2 * 3/2003 Adam ................ C08F 2/24
525/255
2012/0238705 A1   9/2012 Sekiya

FOREIGN PATENT DOCUMENTS

| JP | 03-199212 A | * | 8/1991 |
| JP | 2014-185230 A | | 10/2014 |
| WO | 2011/062173 A1 | | 5/2011 |

OTHER PUBLICATIONS

Okubo, M., et al; Journal of Polymer Science: Polymer Letter Edition, 1982, p. 45-51.*
Ma, G.H., et al; Macromolecules, 2004, p. 2954-2964.*
Odian, G.; Principles of Polymerization, 2004, p. 198-371.*
International Search Report dated Apr. 28, 2015, issued for PCT/JP2015/059418.

* cited by examiner

*Primary Examiner* — Robert S Jones
(74) *Attorney, Agent, or Firm* — Wenderoth, Lind & Ponack, L.L.P.

(57) ABSTRACT

There are provided a method for producing particles by suspension polymerization which ensures an excellent dispersion stability of the monomer and a simpler washing step, composite particles obtainable by this production method, and use of the composite particles. The method for producing composite particles includes a polymerization step of subjecting a monomer mixture which contains a polymerizable vinyl monomer to aqueous suspension polymerization in a presence of small polymer particles having a volume-average particle size of 20 to 500 nm, with a water-soluble cellulose compound adsorbing on surfaces of the small polymer particles, and thereby obtaining composite particles which contain the small polymer particles and large polymer particles greater than the small polymer particles.

21 Claims, 2 Drawing Sheets

COMPOSITE PARTICLES, METHOD FOR PRODUCING COMPOSITE PARTICLES, AND USE THEREOF

TECHNICAL FIELD

The present invention relates to composite particles which contain large polymer particles and small polymer particles adhering to surfaces of the large polymer particles, a method for producing the composite particles, and use thereof (i.e. an external preparation, a coating agent, an optical film, a resin composition, and a molded product).

BACKGROUND ART

Polymer particles having a particle size of 1 to 100 μm are utilized for various uses, such as for an additive (e.g. a flatting agent) for a coating agent such as a coating material, an additive (e.g. a flatting agent) for ink, a main component or an additive for an adhesive, an additive (e.g. a shrinkage reducing agent) for cultured marble, a paper treating agent, a filler (a filler for improving lubricity) for an external preparation such as cosmetics, a column packing material for chromatography, a toner additive for developing an electrostatic image, an anti-blocking agent for a film, and a light diffusing agent for a light diffuser (e.g. a light diffusion film).

The above polymer particles are generally produced by suspension polymerization of a polymerizable monomer. In the process of suspension polymerization, droplets of a polymerizable monomer are dispersed in an aqueous medium in the presence of a suspension stabilizer (a dispersant) by a mechanical shear force with use of a stirrer, and polymerization proceeds within the droplets of the suspended polymerizable monomer. Since suspension polymerization proceeds in a state where the droplets are dispersed, the distribution and the size of the droplets depend on the characteristics, structure, shape, rotational speed, etc. of the stirrer. However, even if the size of the droplets can be miniaturized, droplets may coalesce or flocculate with each other during polymerization, unless the dispersion stability of the droplets can be maintained. Hence, it is important in suspension polymerization to stabilize the droplets of the polymerizable monomer after the droplets are finely dispersed, and thereby to prevent coalescence of the droplets.

In order to prevent coalescence or flocculation of droplets during the polymerization process without fail, choice of the suspension stabilizer is important. Use of various suspension stabilizers have been reported in relation to suspension polymerization. Commonly employed suspension stabilizers include, for example, water-soluble polymers (such as polyvinyl alcohol, gelatin, and starch) and poorly soluble, finely powdered inorganic compounds (such as poorly water-soluble salts including barium sulfate, calcium carbonate, calcium hydroxide, aluminum hydroxide, tricalcium phosphate, and magnesium pyrophosphate; and powders of silicic acid, clay, silica, and metal oxides).

Nevertheless, there are some disadvantages in using the above water-soluble polymers as the suspension stabilizer. First, the particle size distribution of the particles obtained by suspension polymerization is undesirably wide. Second, emulsion polymerization which coincides with suspension polymerization generates many fine particles (particles whose particle sizes are finer than the desired particle size range). Third, it is difficult to remove water-soluble polymers which adhere to surfaces of polymer particles.

On the other hand, the particle size distribution can be comparatively narrowed if the above inorganic compounds are employed as the suspension stabilizer. For example, PTL 1 discloses polymer particles (resin particles) obtained by suspension polymerization of a polymerizable monomer in an aqueous medium, using silica as a suspension stabilizer (a dispersant). In the resulting polymer particles, the coefficient of variation (CV) in particle size is between 10% and 50%.

CITATION LIST

Patent Literature

[PTL 1] WO 2011/062173 A1
[PTL 2] JP 2014-185230 A

SUMMARY OF INVENTION

Technical Problem

Nevertheless, as the suspension stabilizer, the above inorganic compounds also involve disadvantages. In order to obtain fine polymer particles, the inorganic compound is required in a relatively large amount, so that coincident emulsion polymerization generates many fine particles. Besides, the inorganic compound adhering to the surfaces of the polymer particles is likely to fall off from the particle surfaces, and may possibly inhibit the characteristics of products containing the polymer particles (e.g. external preparations, coating agents, and light diffusers). To prevent this problem, the polymer particles need to be washed with a comparatively large amount of acid after the polymerization, and further with a large amount of water, which complicates the production process.

In another respect, in order to improve particle flowability of the polymer particles, it has been known to cause silica particles or other inorganic substances to adhere to the polymer particles (see, for example, PTL 2).

However, the composite particles obtained in this manner are also problematic because products containing such composite particles (e.g. external preparations, coating agents, optical films, resin compositions, and molded products) inevitably contain inorganic substances in addition to the polymer, and such inorganic substances may inhibit the characteristics of the products. Further, the inorganic substances adhering to the surfaces of the polymer particles may detach from the surfaces of the polymer particles, so that seedings (granular bumps visible with the naked eye) may appear on the surfaces of the products.

The present invention was made in consideration of the above circumstances, and aims to provide a method for producing particles by suspension polymerization which ensures an excellent dispersion stability of the monomer and a simpler washing step, composite particles obtainable by this production method, and use of the composite particles.

Solution to Problem

A method of the present invention for producing composite particles includes a polymerization step of subjecting a monomer mixture which contains a polymerizable vinyl monomer to aqueous suspension polymerization in a presence of small polymer particles having a volume-average particle size of 20 to 500 nm, with a water-soluble cellulose compound adsorbing on surfaces of the small polymer particles, and thereby obtaining composite particles which contain the small polymer particles and large polymer particles greater than the small polymer particles. In this application document, the term "polymerizable vinyl monomer" means a compound having no phosphate ester bond and having a polymerizable carbon-carbon double bond (a vinyl bond in a broad sense).

Regarding the aqueous suspension polymerization of a monomer mixture effected in the production method of the present invention, small polymer particles serve as a suspension stabilizer, with the water-soluble cellulose compound adsorbing on the surfaces of the small polymer particles. In the composite particles obtained by the aqueous suspension polymerization, the small polymer particles adhere to the surfaces of the large polymer particles made of the polymer of the monomer mixture and constitute a part of the composite particles, owing to the effect of the water-soluble cellulose compound. Hence, after the aqueous suspension polymerization, it is unnecessary to remove the composite particles by washing. In other words, the production method of the present invention does not substantially require the above water-soluble polymers (except the water-soluble cellulose compound) or the above inorganic compounds which have been used as suspension stabilizers in the conventional suspension polymerization and which need to be removed from the particle surfaces by washing after the polymerization. Rather, owing to the presence of the small polymer particles on whose surfaces the water-soluble cellulose compound has adsorbed, the production method of the present invention can disperse droplets of the monomer mixture in the aqueous medium in a stable state, and can simplify a washing treatment for the particles obtained by the suspension polymerization.

Besides, in the composite particles obtained by the production method of the present invention, the small polymer particles adhering to the surfaces of the large polymer particles make the surfaces of the composite particles uneven. In comparison with spherical polymer particles, the composite particles with uneven surfaces have a smaller contact area with other particles and hence acquires a better particle flowability. Besides, in the production method of the present invention, the monomer mixture containing the polymerizable monomer is subjected to the aqueous suspension polymerization in the presence of the small polymer particles on whose surfaces the water-soluble cellulose compound has adsorbed. Owing to the effect of the water-soluble cellulose compound adsorbing on the surfaces of the small polymer particles, the small polymer particles can firmly adhere to the surfaces of the large polymer particles. Eventually, it is possible to obtain the composite particles in which the small polymer particles hardly fall off from the surfaces of the large polymer particles.

Composite particles of the present invention include: small polymer particles having a particle size of 20 to 500 nm; large polymer particles greater than the small polymer particles, and made of a polymer of a monomer mixture containing a polymerizable vinyl monomer; and a water-soluble cellulose compound, in which the small polymer particles adhere to surfaces of the large polymer particles. In this application document, the term "particle size", when used without any qualifier, means either a volume-average particle size as measured by the method described in the Examples below, or a particle size obtained from an image such as a transmission electron microscope (TEM) image.

The composite particles, in which the small polymer particles adhere to the surfaces of the large polymer particles owing to the water-soluble cellulose compound contained therein, have acquired a novel structure unknown from the conventional structures. Further, in the composite particles, the small polymer particles adhering to the surfaces of the large polymer particles make the surfaces of the composite particles uneven, so that the composite particles have a better particle flowability than spherical polymer particles.

An external preparation of the present invention contains the composite particles of the present invention.

The external preparation of the present invention containing the composite particles of the present invention has good lubricity.

A coating agent of the present invention contains the composite particles of the present invention.

The coating agent of the present invention containing the composite particles of the present invention can impart light diffusibility to a coating film formed by the coating agent.

An optical film of the present invention is obtainable by applying the coating agent onto a base material.

The optical film of the present invention containing the coating agent of the present invention has light diffusibility.

A resin composition of the present invention contains the composite particles of the present invention and a base resin.

The resin composition of the present invention containing the composite particles of the present invention has light diffusibility.

A molded product of the present invention is obtainable by molding the resin composition of the present invention.

The molded product of the present invention, obtainable by molding the resin composition containing the composite particles of the present invention, has light diffusibility owing to the composite particles of the present invention contained therein.

Advantageous Effects of Invention

The present invention can provide a method for producing particles by suspension polymerization which ensures an excellent dispersion stability of the monomer and a simpler washing step, composite particles obtainable by this production method, and use of the composite particles.

DESCRIPTION OF EMBODIMENTS

Figure 1:
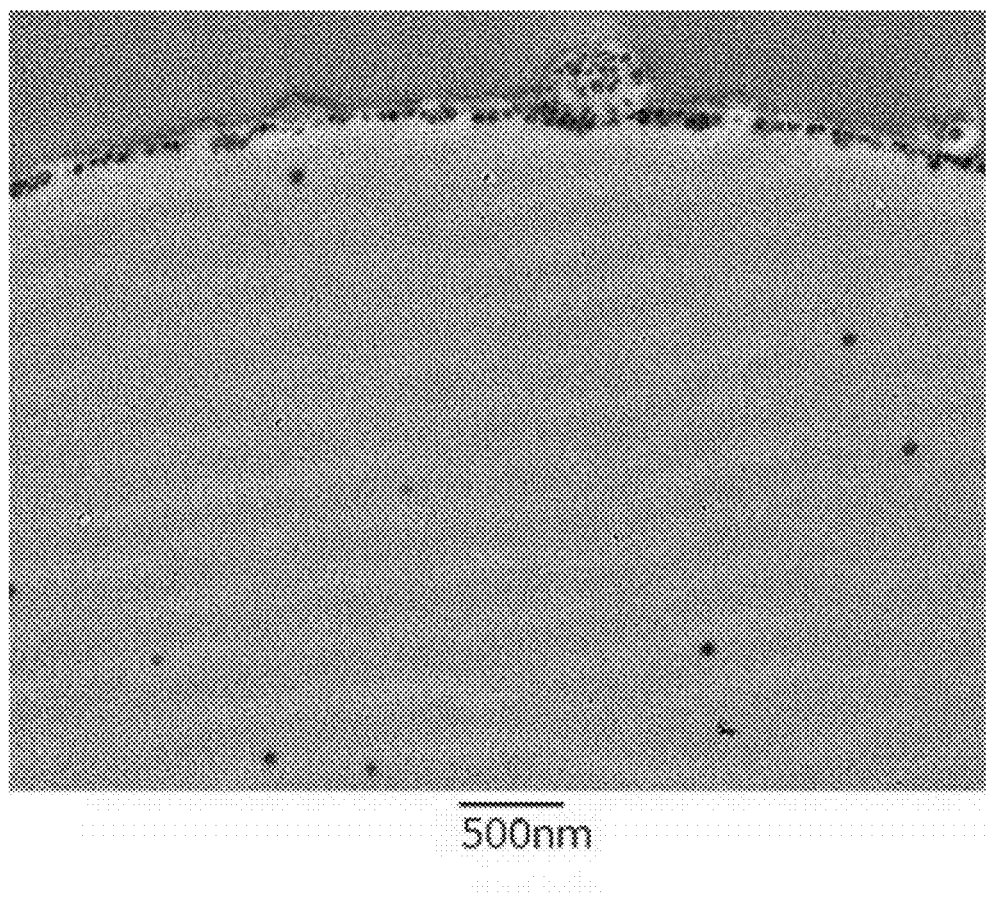
FIG. 1 is a transmission electron microscope (TEM) image showing, on an enlarged scale, a partial cross section of a composite particle obtained in Example 12 of the present invention.

Hereinafter, the present invention will be described in detail.

[Method for Producing Composite Particles]

The method of the present invention for producing composite particles includes a polymerization step of subjecting a monomer mixture containing a polymerizable vinyl monomer to aqueous suspension polymerization in the presence of small polymer particles having a volume-average particle size of 20 to 500 nm, with a water-soluble cellulose compound adsorbing on surfaces of the small polymer particles, and thereby obtaining composite particles which contain the small polymer particles and large polymer particles greater than the small polymer particles.

(Polymerizable Vinyl Monomer)

The polymerizable vinyl monomer used in the production method of the present invention is a compound having no phosphate ester bond and having a polymerizable carbon-carbon double bond (a vinyl bond in a broad sense).

The polymerizable vinyl monomer is not particularly limited, and may be a monofunctional monomer having an alkylene group (a vinyl group in a broad sense), a polyfunctional monomer having at least two alkylene groups (vinyl groups in a broad sense), or the like.

Examples of the monofunctional monomer include: α-methylene aliphatic monocarboxylic acid ester; styrene; styrene derivatives such as o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene, and 3,4-dichlorostyrene; vinyl carboxylates such as vinyl acetate, vinyl propionate, and vinyl butyrate; acrylic acid derivatives other than acrylic acid ester, such as acrylonitrile and acrylamide; and methacrylic acid derivatives other than methacrylic acid ester, such as methacrylonitrile and methacrylamide.

Examples of the α-methylene aliphatic monocarboxylic acid ester include: acrylic acid esters such as methyl acrylate, ethyl acrylate, propyl acrylate, n-butyl acrylate, isobutyl acrylate, n-octyl acrylate, dodecyl acrylate, 2-ethylhexyl acrylate, stearyl acrylate, lauryl acrylate, 2-chloroethyl acrylate, phenyl acrylate, 2-(dimethylamino)ethyl acrylate, 2-(diethylamino)ethyl acrylate, 2-hydroxyethyl acrylate, and 2-hydroxypropyl acrylate; methacrylic acid esters such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, lauryl methacrylate, phenyl methacrylate, 2-(dimethylamino)ethyl methacrylate, 2-(diethylamino)ethyl methacrylate, 2-hydroxyethyl methacrylate, and 2-hydroxypropyl methacrylate; and α-haloacrylic acid esters such as methyl α-chloroacrylate.

Depending on the circumstances, α,β-unsaturated carboxylic acids such as acrylic acid, methacrylic acid, maleic acid, and fumaric acid may be used as the monofunctional monomer. These α,β-unsaturated carboxylic acids may be used in combination of two or more. Further, the monofunctional monomer may be: vinyl ethers such as methyl vinyl ether, ethyl vinyl ether, and isobutyl vinyl ether; vinyl ketones such as methyl vinyl ketone, hexyl vinyl ketone, and methyl isopropenyl ketone; N-vinyl compounds such as N-vinylpyrrole, N-vinylcarbazole, N-vinylindole, and N-vinylpyrrolidone; and vinylnaphthalene salts. These vinyl compounds may be used alone or in combination of two or more, unless they prevent the effects of the present invention.

In the present invention, the above-mentioned monofunctional monomers may be used alone or in combination of two or more. Among the above monofunctional monomers, styrene, methyl methacrylate and the like are inexpensive and hence more preferable as the monofunctional monomer used in the present invention.

Examples of the polyfunctional monomer include: divinylbenzene; bifunctional alkylene glycol di(meth)acrylates such as ethylene glycol di(meth)acrylate, polyethylene glycol di(meth)acrylate (having 2-10 repeating units), propylene glycol di(meth)acrylate, polypropylene glycol di(meth)acrylate (having 2-10 repeating units), 1,3-butylene glycol di(meth)acrylate, neopentyl glycol di(meth)acrylate, alkoxylated neopentyl glycol di(meth)acrylate, prop oxylated neopentyl glycol di(meth)acrylate, neopentyl glycol hydroxypivalate di(meth)acrylate, and dioxane glycol di(meth)acrylate; bifunctional alkylenediol di(meth)acrylates such as butylenediol di(meth)acrylate, hexanediol di(meth)acrylate, alkoxylated hexanediol di(meth)acrylate, cyclohexanediol di(meth)acrylate, dodecanediol di(meth)acrylate, and tricyclodecanediol di(meth)acrylate; bifunctional ethoxylated bisphenol A di(meth)acrylates such as ethoxylated (having 2-10 repeating units) bisphenol A di(meth)acrylate; trifunctional trimethylolpropane tri(meth)acrylates such as trimethylolpropane tri(meth)acrylate, ethoxylated trimethylolpropane tri(meth)acrylate, pentaerythritol tri(meth)acrylate, and triacryloyloxyethyl phosphate; tetrafunctional tetra(meth)acrylates such as pentaerythritol tetra(meth)acrylate, and ditrimethylolpropane tetra(meth)acrylate; hexafunctional dipentaerythritol hexa(meth)acrylates such as dipentaerythritol hexa(meth)acrylate; octafunctional pentaerythritol (meth)acrylates such as poly(pentaerythritol) acrylate; and nitrogen atom-containing trifunctional cyclic (meth)acrylates such as ethoxylated isocyanuric acid tri(meth)acrylate. In this application document, the term "(meth)acrylate" means methacrylate or acrylate.

Preferably, the polymerizable vinyl monomer employed in the production method of the present invention is a combination of the monofunctional monomer and the polyfunctional monomer. Owing to the combined use, good crosslinked structures can be formed in the large polymer particles, and an excellent solvent resistance can be imparted to the composite particles. The amount of the polyfunctional monomer to be used is preferably within the range from 0.5 to 50 wt %, and more preferably within the range from 1 to 40 wt %, based on the total amount of the polymerizable vinyl monomer to be used. Then, it is possible to form even better crosslinked structures in the large polymer particles and to impart a more excellent solvent resistance to the composite particles.

Preferably, in the production method of the present invention, the monomer mixture containing the polymerizable vinyl monomer further contains at least one polymerizable phosphoric acid monomer represented by Formula (1) or (2) below. Addition of the polymerizable phosphoric acid monomer to the monomer mixture can improve stability of the droplets of the monomer mixture in the aqueous medium when the monomer mixture is subjected to the aqueous suspension polymerization.

[Chemical Formula 1]

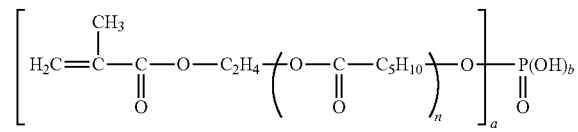

(In Formula (1), n represents 1 to 5. When a equals 1, b equals 2, while when a equals 2, b equals 1.)

[Chemical Formula 2]

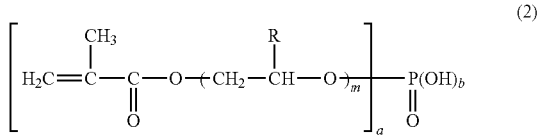

(In Formula (2), R is hydrogen, a methyl group, or a chloromethyl group, and m is 1 to 20. When a equals 1, b equals 2, while when a equals 2, b equals 1.)

Specific examples of the polymerizable phosphoric acid monomer represented by Formula (1) above include "KAYAMER® PM-21" manufactured by Nippon Kayaku Co., Ltd. (a mixture of a compound of Formula (1) above wherein n=1, a=1 and b=2 and a compound of Formula (1) above wherein n=1, a=2 and b=1, mixed at a molar ratio of 1:1), and the like.

Specific examples of the polymerizable phosphoric acid monomer represented by Formula (2) include: "Adeka Reasoap® PP-70" manufactured by ADEKA CORPORATION (a compound of Formula (2) above, wherein R is a methyl group, and m is 10 to 12); "KAYAMER® PM-1" (a compound of Formula (2) above, wherein R is hydrogen, m=1, a=1 and L2), and "KAYAMER® PM-2" (a compound of Formula (2) above, wherein R is hydrogen, m=1, a=2 and b=1), both manufactured by Nippon Kayaku Co., Ltd.; "LIGHT ESTER P-1M" (a compound of Formula (2) above, wherein R is hydrogen, m=1, a=1 and b=2), and "LIGHT ESTER P-2M" (a compound of Formula (2) above, wherein R is hydrogen, m=1, a=2 and b=1), both manufactured by KYOEISHA CHEMICAL CO., LTD; and "Phosmer® M" (a compound of Formula (2) above, wherein R is hydrogen, m=1, a=1 and b=2), "Phosmer® PE" (a compound of Formula (2) above, wherein R is hydrogen, m=4 to 5, a=1 and b=2), "Phosmer® CL" (a compound of Formula (2) above, wherein R is a chloromethyl group, m=1, a=1 and b=2), and "Phosmer® PP" (a compound of Formula (2) above, wherein R is a methyl group, m is 5 to 6, a=1 and b=2), each manufactured by Uni-Chemical Co., Ltd.

In the present invention, if the above polymerizable phosphoric acid monomer is added to the monomer mixture containing the polymerizable vinyl monomer, the amount of the polymerizable phosphoric acid monomer to be used preferably falls within the range from 0.01 to 1 part by weight, and more preferably within the range from 0.01 to 0.8 parts by weight, relative to 100 parts by weight of the polymerizable vinyl monomer. If the amount of the polymerizable phosphoric acid monomer exceeds 1 part by weight relative to 100 parts by weight of the polymerizable vinyl monomer, composite particles obtained by the polymerization process are likely to include emulsified particles (by-product fine particles in the emulsion polymerization) or other fine particles whose particle sizes are too small. As a result, the coefficient of variation in the composite particle size may increase undesirably.

(Aqueous Medium)

In the polymerization step in the production method of the present invention, examples of the aqueous medium for subjecting the monomer mixture containing the polymerizable vinyl monomer to the aqueous suspension polymerization include water, and a mixed medium of water and a water-soluble medium (e.g. alcohol such as methanol or ethanol). In order to stabilize the composite particles, it is generally preferable to use 100 to 1000 parts by weight of the aqueous medium relative to 100 parts by weight of the polymerizable monomer.

(Polymerization Initiator)

In the polymerization step in the production method of the present invention, the aqueous suspension polymerization of the monomer mixture containing the polymerizable vinyl monomer is preferably conducted in the presence of a polymerization initiator.

As the polymerization initiator, an oil-soluble peroxide polymerization initiator or an oil-soluble azo polymerization initiator, each being generally used for the aqueous suspension polymerization, can be used suitably.

Examples of the peroxide polymerization initiator include benzoyl peroxide, lauroyl peroxide, octanoyl peroxide, ortho-chlorobenzoyl peroxide, ortho-methoxybenzoyl peroxide, methyl ethyl ketone peroxide, diisopropyl peroxydicarbonate, cumene hydroperoxide, cyclohexanone peroxide, t-butylhydroperoxide, and diisopropylbenzene hydroperoxide.

Examples of the azo polymerization initiator include 2,2'-azobisisobutyronitrile, 2,2'-azobis(2,4-dimethylvaleronitrile), 2,2'-azobis(2,3-dimethylbutyronitrile), 2,2'-azobis(2-methylbutyronitrile), 2,2'-azobis(2,3,3-trimethylbutyronitrile), 2,2'-azobis(2-isopropylbutyronitrile), 1,1'-azobis(cyclohexane-1-carbonitrile), 2,2'-azobis(4-methoxy-2,4-dimethylvaleronitrile), (2-carbamoylazo)isobutyronitrile, 4,4'-azobis(4-cyanovaleric acid), and dimethyl-2,2'-azobisisobutyrate.

Among these polymerization initiators, 2,2'-azobisisobutyronitrile, 2,2'-azobis(2,4-dimethylvaleronitrile), benzoyl peroxide, lauroyl peroxide, and the like can be preferably used as the polymerization initiator for the production method of the present invention, from the standpoint of decomposition rate and the like. The above-mentioned polymerization initiators may be used alone or in combination of two or more.

The amount of the polymerization initiator to be used is preferably 0.01 to 10 parts by weight, and more preferably 0.1 to 5.0 parts by weight, relative to 100 parts by weight of the polymerizable vinyl monomer. If the used amount of the polymerization initiator is less than 0.01 part by weight with respect to 100 parts by weight of the polymerizable vinyl monomer used, the polymerization initiator is less likely to serve its function sufficiently. If the used amount of the polymerization initiator is more than 10 parts by weight, the increase in the amount of the polymerization initiator is not rewarded by corresponding effects, which is uneconomical and undesirable.

(Small Polymer Particles with Water-Soluble Cellulose Compound Adsorbing on Surfaces Thereof)

In the polymerization step in the production method of the present invention, the aqueous suspension polymerization of the monomer mixture containing the polymerizable vinyl monomer is conducted in the presence of the small polymer particles on whose surfaces the water-soluble cellulose compound has adsorbed. In the polymerization step, the small polymer particles, with the water-soluble cellulose compound adsorbing on surfaces thereof, serve as a suspension stabilizer.

The small polymer particles have a volume-average particle size of 20 to 500 nm, and preferably have a volume-average particle size of 20 to 120 nm. If the volume-average particle size of the small polymer particles is less than 20 nm, stable production of composite particles having uniform particle sizes is difficult in the polymerization step. If the volume-average particle size of the small polymer particles is greater than 500 nm, the amount of the small polymer particles required for stable suspension polymerization in the polymerization step increases so much as to be uneconomical. Besides, it is difficult to effect stable dispersion of the mixture containing the polymerizable vinyl monomer.

The polymer constituting the small polymer particles is not particularly limited and may be, for example, a polymer of the polymerizable vinyl monomer.

Preferably, the polymerizable vinyl monomer contains a hydrophilic monofunctional monomer. Namely, the small polymer particles are preferably made of a polymer of a polymerizable vinyl monomer containing a hydrophilic monofunctional monomer. The resulting small polymer particles are hydrophilic, and allow a greater amount of the water-soluble cellulose to adsorb on the small polymer particles. As a result, the dispersion stability during the aqueous suspension polymerization can be enhanced.

The hydrophilic monofunctional monomer is a monofunctional monomer having an ethylenic unsaturated group, and is a monofunctional monomer having a hydrophilic group such as a carboxyl group (or a salt thereof), a sulfonate group (or a salt thereof), a phosphate group (or a salt thereof), a hydroxyl group (a hydroxy group), an ether group, an amino group, an amide group, or the like. Preferably, the hydrophilic monofunctional monomer is a monofunctional monomer having an ether group and a hydroxyl group, and/or a monofunctional monomer having an ester group and a hydroxyl group. As the monofunctional monomer having an ester group and a hydroxyl group, a monofunctional monomer having two or more ester groups and a hydroxyl group is preferable. In this case, the small polymer particles can be more hydrophilic, and can further increase the amount of the water-soluble cellulose adsorbing on the small polymer particles, so that the dispersion stability during the aqueous suspension polymerization can be enhanced further. The ether group include a group derived from ethylene glycol (an oxyethylene group) and a group derived from propylene glycol (an oxypropylene group). The ester group include a group derived from lactone.

Preferably, the hydrophilic monofunctional monomer is a hydrophilic monofunctional monomer represented by following General Formula:

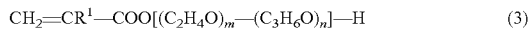

$$CH_2=CR^1-COO[(C_2H_4O)_m-(C_3H_6O)_n]-H \quad (3)$$

(wherein $R^1$ represents H or $CH_3$, m is 0 to 50, n is 0 to 50, with a proviso that m and n should not be 0 at the same time), and/or a hydrophilic monofunctional monomer represented by following General Formula:

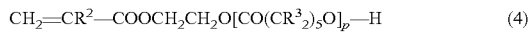

$$CH_2=CR^2-COOCH_2CH_2O[CO(CR^3_2)_5O]_p-H \quad (4)$$

(wherein $R^2$ and $R^3$ independently represent H or $CH_3$, and p is 1 to 50).

In General Formula (3), the part $[(C_2H_4O)_m-(C_3H_6O)_n]$ means that there are m structural units $(C_2H_4O)$ at desired positions in this portion and that there are n structural units $(C_3H_6O)$ at desired positions in this portion. The bonding order of these structural units should not be limited. Namely, the structural units $(C_2H_4O)$ and $(C_3H_6O)$ may be block bonded, randomly bonded, alternately bonded, or bonded in combination of these.

As the compound represented by General Formula (3), a compound wherein at least either of m or n is greater than 50 is undesirable because the polymerization stability may deteriorate so much as to generate coalesced particles. A preferable value for each of m and n is from 1 to 30. Preferably, the compound represented by General Formula (3) is a monofunctional monomer having an ether group and a hydroxyl group, namely a compound wherein m+n>1, which can improve hydrophilicity of the small polymer particles further.

As the compound represented by General Formula (4), a compound wherein p is greater than 50 is undesirable because the polymerization stability may deteriorate so much as to generate coalesced particles. A preferable value for p is from 1 to 30.

The hydrophilic monofunctional monomers represented by General Formula (3) or General Formula (4) above are commercially available. Commercial products of the hydrophilic monofunctional monomer represented by General Formula (3) include, for example, "Blemmer®" series manufactured by NOF Corporation. Commercial products of the hydrophilic monofunctional monomer represented by General Formula (4) include, for example, "Placcel® F" series manufactured by Daicel Corporation.

Among the "Blemmer®" series, the products suitable for the present invention are "Blemmer® 50PEP-300" (a compound of General Formula (3) above, wherein $R^1$ is $CH_3$, m is about 3.5, and n is about 2.5), "Blemmer® 70PEP-350B" (a compound of General Formula (3) above, wherein $R^1$ is $CH_3$, m is about 5, and n is about 2), "Blemmer® PP-1000" (a compound of General Formula (3) above, wherein $R^1$ is $CH_3$, m is 0, and n is about 4 to 6), "Blemmer® PP-500" (a compound of General Formula (3) above, wherein $R^1$ is $CH_3$, m is 0, and n is about 9), "Blemmer® PP-800" (a compound of General Formula (3) above, wherein $R^1$ is $CH_3$, m is 0, and n is about 13), "Blemmer® PE-90" (a compound of General Formula (3) above, wherein $R^1$ is $CH_3$, m is about 2, and n is 0), "Blemmer® PE-200" (a compound of General Formula (3) above, wherein $R^1$ is $CH_3$, m is about 4.5, and n is 0), "Blemmer® PE-350" (a compound of General Formula (3) above, wherein $R^1$ is $CH_3$, m is about 8, and n is 0), etc.

Among the "Placcel® F" series, the products suitable for the present invention are "Placcel® FM1" and "Placcel® FM1D" (compounds of General Formula (4) above, wherein $R^2$ is $CH_3$, $R^3$ is H, and p is 1), "Placcel® FM2D" (a compound of General Formula (4) above, wherein $R^2$ is $CH_3$, $R^3$ is H, and p is 2), "Placcel® FM3" (a compound of General Formula (4) above, wherein $R^2$ is $CH_3$, $R^3$ is H, and p is 3), "Placcel® FM4" (a compound of General Formula (4) above, wherein $R^2$ is $CH_3$, $R^3$ is H, and p is 4), and "Placcel® FM5" (a compound of General Formula (4) above, wherein $R^2$ is $CH_3$, $R^3$ is H, and p is 5), etc.

Additionally, the hydrophilic monofunctional monomer may be a monofunctional monomer having a different hydroxyl group, a monofunctional monomer having a carboxyl group (or a salt thereof), a monofunctional monomer having a sulfonate group (or a salt thereof), a monofunctional monomer having a phosphate group (or a salt thereof), a monofunctional monomer having a different ether group, a monofunctional monomer having an amino group, a monofunctional monomer having an amide group, etc.

Examples of the monofunctional monomer having a different hydroxyl group include 2-hydroxypropyl (meth)acrylate, 2-hydroxybutyl methacrylate, 4-hydroxybutyl (meth)acrylate, 2-hydroxyethylmethyl maleate, di(2-hydroxypropyl) maleate, a-hydroxystyrene, 2-hydroxyethyl (meth)acrylamide, glycosylethyl (meth)acrylate, and the like. In this application document, the term "(meth)acrylate" means methacrylate or acrylate.

Examples of the monofunctional monomer having a carboxyl group (or a salt thereof) include (meth)acrylic acid, itaconic acid, maleic acid, fumaric acid, crotonic acid, monomethyl maleate, monoethyl maleate, mono(2-ethylhexyl) maleate, and salts thereof (alkali metal salts, alkaline earth metal salts, ammonium salts, amine salts, etc.), carboxybetaine-containing monomers, and the like. Examples of the carboxybetaine-containing monomers include N-methacryloyloxyethyl-N,N-dimethylammonium-α-N-methyl carboxybetaine, N-methacryloyloxymethyl-N,N-dimethylammonium-α-N-methylcarboxybetaine, N-acryloyloxyethyl-N,N-dimethylammonium-α-N-methyl carboxybetaine, N-methacryloyloxymethyl-N,N-dimethylammonium-α-N-methyl carboxybetaine, and the like.

Examples of the monofunctional monomer having a sulfonate group (or a salt thereof) include tert-butylacrylamidosulfonic acid, p-styrenesulfonic acid sodium, allylsulfonic acid, vinylsulfonic acid, vinylsulfonic acid sodium, 2-sulfoethyl (meth)acrylate, 2-(meth)acrylamide-2-methylpropane sulfonic acid, styrenesulfonic acid, sulphobetaine-containing monomers, and the like. Examples of the sulphobetaine-containing monomers include 1-(3-sulfopropyl)-2-vinylpyridinium betaine, N,N-dimethyl-N-acryloyloxyethyl-N-(3-sulfopropyl)-ammonium betaine, N,N-dimethyl-N-methacryloyloxyethyl-N-(3-sulfopropyl)-ammonium betaine, N,N-dimethyl-N-methacrylamidopropyl-N-(3-sulfopropyl)-ammonium betaine, and the like.

Examples of the monofunctional monomer having a phosphate group (or a salt thereof) include vinylphosphonic acid, vinyl phosphate, acid phosphoxyethyl (meth)acrylate, and the like.

Examples of the monofunctional monomer having a different ether group include (meth)acrylic acid esters each of which contains a polyoxyalkylene chain (the repeating count of the oxyalkylene chain may be as few as two) having a terminal alkyl or aryl group, vinyl ethers, (meth)acrylic morpholine, and the like. Examples of the (meth)acrylic acid esters each of which contains a polyoxyalkylene chain having a terminal alkyl or aryl group include methoxy polyethylene glycol mono(meth)acrylate, methoxy polyethyleneglycol-polypropylene glycol (meth)acrylate, ethoxy diethylene glycol acrylate, ethoxy polyethylene glycol mono (meth)acrylate, ethoxy polyethylene glycol-polypropylene glycol (meth)acrylate, octoxy polyethylene glycol polypropylene glycol mono(meth)acrylate, octoxy poly(ethylene glycol propylene glycol) mono(meth)acrylate, lauroxy polyethylene glycol monomethacrylate, stearoxy polyethylene glycol polypropylene glycol mono(meth)acrylate, stearoxy poly(ethylene glycol propylene glycol) mono(meth)acrylate, phenoxy polyethylene glycol (meth)acrylate, phenoxy polyethylene glycol-polypropylene glycol (meth)acrylate, and the like. Examples of the vinyl ethers include vinyl methyl ether, vinyl ethyl ether, vinyl isobutyl ether, and the like.

Examples of the monofunctional monomer having an amino group include a monofunctional monomer having a quarternary amino group, a (meth)acrylic acid ester having an alkylamino group, aminomethyl (meth)acrylate, an unsaturated amide having an alkylamino group, vinylpyridines, dimethylaminoethyl vinyl ether, vinylimidazole, and the like. Examples of the monofunctional monomer having a quarternary amino group include methacryloyloxyethyltrimethylammonium chloride, methacryloylaminopropyltrimethylammonium chloride, methacryloyloxyethyltrimethylammonium methyl sulphate, methacryloylaminopropyltrimethylammonium methyl sulphate, and the like. Examples of the (meth)acrylic acid ester having an alkylamino group include N-methylaminoethyl (meth)acrylate, N-methylaminoethyl acrylate, dimethylaminoethyl (meth)acrylate, diethylaminoethyl (meth)acrylate, dipropylaminoethyl (meth)acrylate, and the like. Examples of the unsaturated amide having an alkylamino group include dimethylaminoethyl (meth)acrylamide, dimethylaminopropyl (meth)acrylamide, diethylaminopropyl (meth)acrylamide, and the like. Examples of the vinylpyridines include 2-vinylpyridine, 4-vinylpyridine, and the like.

Examples of the monofunctional monomer having an amide group include (meth)acrylamide, N,N-dimethyl acrylamide, N-vinyl-2-pyrrolidone, α-ethyl acrylamide, N-methyl (meth)acrylamide, N-butoxymethyl (meth)acrylamide, diacetone (meth)acrylamide, N-vinyl piperidone, and the like. These hydrophilic monofunctional monomers may be used alone or in combination of two or more.

In the polymerizable vinyl monomer, the content of the hydrophilic monofunctional monomer is preferably 50 parts by weight or less relative to 100 parts by weight of the polymerizable vinyl monomer. If the content of the hydrophilic monofunctional monomer in the polymerizable vinyl monomer is more than 50 parts by weight, the small polymer particles become too hydrophilic and less likely to adhere to the surfaces of the large polymer particles.

Preferably, the polymer constituting the small polymer particles is a crosslinked polymer, for example, a copolymer of the above-mentioned monofunctional monomer and the above-mentioned polyfunctional monomer. The small polymer particles made of a crosslinked polymer can be prevented from swelling during the aqueous suspension polymerization, so that the particle size of the resulting composite particles can be more uniform. Besides, if the composite particles obtained in the above-mentioned polymerization step are blended in a coating agent such as a coating material or a coating film, it is not only possible to prevent the small polymer particles from swelling in the presence of the solvent contained in the coating agent or the coating film, but also possible to attain scratch resistance. When the small polymer particles are made of a crosslinked polymer, the degree of polymerization is preferably between 0.01 and 50 wt %, and more preferably between 5 and 40 wt %. It should be understood that the degree of polymerization of the small polymer particles is the content (wt %) of the structural unit derived from the polyfunctional monomer in the small polymer particles, and is substantially equal to the content of the polyfunctional monomer (wt %) in the monomer mixture to be used for the production of the small polymer particles.

The small polymer particles may be obtained by any polymerization method as far as the volume-average particle size of the polymer particles is from 20 to 500 nm. For polymerization of the small polymer particles, known methods such as emulsion polymerization (including soap-free emulsion polymerization) and suspension polymerization can be employed. Considering the uniformity of the particle size of the small polymer particles and the simplicity of the production method, emulsion polymerization is preferred as the method for polymerizing the small polymer particles. The following description is directed to a method for producing small polymer particles based on emulsion polymerization, but the method should not be limited thereto.

To produce the small polymer particles by emulsion polymerization, first, a polymerizable vinyl monomer is dispersed in an aqueous medium to give an aqueous emulsion. For example, the above-mentioned polymerizable vinyl monomer is added to and dispersed in an aqueous medium, by a fine emulsifying machine such as a main stirrer, a homogenizer, an ultrasonic processor, or a Nanomizer, to give an aqueous emulsion. The aqueous emulsion is heated to a polymerization temperature. Next, after the reaction system is purged (replaced) with an inert gas such as nitrogen, water in which a polymerization initiator is dissolved is continuously added dropwise into the aqueous emulsion to start polymerization. As a result, small polymer particles are obtained. The polymerization temperature can be suitably chosen in accordance with the species of the polymerizable vinyl monomer and the species of the polymerization initiator, and is preferably in the range from 25 to 110° C., and more preferably in the range from 50 to 100° C. The polymerization time can be suitably set in accordance with the species and the amount of the polymerizable vinyl monomer, the species and the amount of the polymerization initiator, and the like, and is preferably, for example, from 2 to 10 hours. The stirring speed of the fine emulsifying machine can be suitably set in accordance with the type and the stirring capacity of the fine emulsifying machine, and is preferably, for example, from 100 to 500 rpm for a 5-liter reactor. Where necessary, after the completion of the polymerization, the small polymer particles may be separated from the aqueous medium by filtration, centrifugal separation, etc., and the separated small polymer particles may be washed with water and a solvent and then dried.

The aqueous medium employed in the emulsion polymerization for producing the small polymer particles may be water, or a mixture of water and a water-soluble solvent (for example, a lower alcohol (an alcohol having 5 or less carbon atoms)). A surfactant may be or may not be added to the aqueous medium.

The amount of the aqueous medium is preferably in the range from 200 to 2000 parts by weight, and more preferably in the range from 300 to 1500 parts by weight, relative to 100 parts by weight of the polymerizable vinyl monomer employed in the emulsion polymerization described above. Use of the aqueous medium in an amount of less than 200 parts by weight is undesirable because the particles may be unstable during the polymerization and flocs of polymer particles (flocs of the small polymer particles) may be generated after the polymerization. Use of the aqueous medium in an amount of more than 2000 parts by weight is also undesirable because productivity may be sacrificed.

The surfactant employed in the emulsion polymerization for producing the small polymer particles may be any of non-reactive anionic surfactants (anionic surfactants having no ethylenic unsaturated group), reactive anionic surfactants (anionic surfactants having an ethylenic unsaturated group), cationic surfactants, zwitterionic surfactants, and non-ionic surfactants. Among them, reactive anionic surfactants are preferable. These surfactants may be used alone or in combination of two or more.

The non-reactive anionic surfactants include: sodium oleate; fatty acid soaps such as castor oil potassium soap; alkyl sulfate ester salts such as sodium lauryl sulfate, and ammonium lauryl sulfate; alkyl benzene sulfonates such as sodium dodecyl benzene sulfonate; alkyl naphthalene sulfonates; alkyl sulfonates (alkane sulfonates) such as sodium dodecyl sulfonate; sulfosuccinates; dialkyl sulfosuccinates such as dioctyl sodium sulfosuccinate; alkyl phosphate ester salts; phosphate ester salts such as polyoxyethylene alkyl phenyl ether sodium phosphate, and polyoxyalkylene aryl ether sodium phosphate; naphthalene sulfonate formalin condensates and salts thereof polyoxyethylene alkyl phenyl ether sulfate ester salts; polyoxyethylene alkyl sulfate ester salts; etc.

Each of the above reactive anionic surfactants contain, as an anionic part, sulfonic acid salt, sulfuric acid salt, phosphoric acid salt, phosphate ester, sulfosuccinic acid salt, carboxylate salt, acyl amino acid salt, etc. This anionic part acts as a functional group at the surfaces of the small polymer particles. Specific salts include ammonium salt, sodium salt, potassium salt, etc.

Specific examples of the reactive anionic surfactants include: reactive anionic surfactants each having a polyoxyalkylene part, such as polyoxyethylene-1-(allyloxymethyl) alkyl ether sulfate, ammonium salt, manufactured by DKS Co. Ltd. under the trade names "AQUALON® KH-10" (polyoxyethylene chain length of 10), and "AQUALON® KH-1025" (25-wt % aqueous solution of "AQUALON® KH-10"); polyoxyethylene alkyl propenyl phenyl ether sulfate, ammonium salt, manufactured by DKS Co. Ltd. under the trade names "AQUALON® HS-10" (polyoxyethylene chain length of 10), "AQUALON® HS-20" (polyoxyethylene chain length of 20), "AQUALON® BC-10" (polyoxyethylene chain length of 10), and "AQUALON® BC-20" (polyoxyethylene chain length of 20); polyoxyalkylene alkenyl ether ammonium sulfate manufactured by Kao Corporation under the trade name "LATEMUL® PD-104"; α-sulfo-ω-(1-alkoxymethyl-2-(2-propenyloxy)ethoxy)-poly (oxy-1,2-ethanediyl), ammonium salt, manufactured by ADEKA CORPORATION under the trade names "Adeka Reasoap® SR-10" (polyoxyethylene chain length of 10) and "Adeka Reasoap® SR-20" (polyoxyethylene chain length of 20); polyoxypropylene allyl ether phosphate manufactured by ADEKA CORPORATION under the trade name "Adeka Reasoap® PP-70"; and bis(polyoxyethylene phenyl ether) methacrylate sulfate ester salt manufactured by Nippon Nyukazai Co., Ltd. under the trade name "Antox MS-60".

In addition to the above-mentioned reactive anionic surfactants having a polyoxyalkylene part, the reactive anionic surfactants may be, for example, sodium p-styrenesulfonate, sodium allyl alkyl sulfonate, etc.

Examples of the non-ionic surfactants include: polyoxyethylene alkyl ethers such as polyoxyethylene tridecyl ether; polyoxyethylene alkyl phenyl ethers; polyoxyethylene styrenated phenyl ether; polyoxyalkylene alkyl ethers in which the alkylene group has three or more carbon atoms, such as polyoxyalkylenetridecyl ether; polyoxyethylene fatty acid ester; sorbitan fatty acid esters such as sorbitan monostearate, and sorbitan monopalmitate; polyoxyethylene sorbitan fatty acid esters such as polyoxyethylene sorbitan monolaurate; polyoxyethylene alkylamines; glycerin fatty acid ester; oxyethylene-oxypropylene block polymer; and sucrose fatty acid ester (e.g. trade name "RYOTO® sugar ester" manufactured by Mitsubishi-Kagaku Foods Corporation).

Examples of the cationic surfactants include: alkylamine salts such as laurylamine acetate and stearylamine acetate; quaternary ammonium salts such as lauryl trimethyl ammonium chloride; etc.

Examples of the zwitterionic surfactants include lauryl dimethylamine oxide, phosphate ester-based zwitterionic surfactants, phosphite ester-based zwitterionic surfactants, etc.

In the emulsion polymerization for producing the small polymer particles, the amount of the surfactant is preferably in the range from 0.01 to 5 parts by weight relative to 100 parts by weight of the polymerizable vinyl monomer employed in the emulsion polymerization.

The polymerization initiator employed in the emulsion polymerization for producing the small polymer particles include: organic peroxides such as benzoyl peroxide, lauroyl peroxide, acetyl peroxide, methyl ethyl ketone peroxide, tert-butyl peroxide, and dicumyl peroxide; azo compounds such as 2,2'-azobisisobutyronitrile, 2,2'-azobis(2,4-dimethylvaleronitrile), 2,2'-azobis[2-(2-imidazoline-2-yl)propane] dihydrochloride, 2,2'-azobis[2-(2-imidazoline-2-yl)propane]disulfate dihydrate, 2,2'-azobis(2-amidinopropane)

dihydrochloride, 2,2'-azobis[N-(2-carboxyethyl)-2-methylpropionamidine] hydrate, 2,2'-azobis{2-[1-(2-hydroxyethyl)-2-imidazoline-2-yl]propane}dihydrochloride, 2,2'-azobis[2-(2-imidazoline-2-yl)propane], 2,2'-azobis(1-imino-1-pyrrolidino-2-methylpropane)dihydrochloride, 2,2'-azobis{2-methyl-N-[1,1-bis(hydroxymethyl)-2-hydroxyethyl]propionamide}, 2,2'-azobis[2-methyl-N-(2-hydroxyethyl)propionamide], and 4,4-azobis(4-cyanopentanoic acid); persulfates such as potassium persulfate, ammonium persulfate, and sodium persulfate; etc. These polymerization initiators may be used alone or in combination of two or more. The polymerization initiator may also be a combination of any of the above persulfates or the above organic peroxides with a reducing agent, the combination being called redox polymerization initiator. Examples of the reducing agent include sodium sulfoxylate formaldehyde, sodium bisulfite, ammonium bisulfite, sodium thiosulfate, ammonium thiosulfate, hydrogen peroxide, sodium hydroxymethanesulfinate, L-ascorbic acid or a salt thereof, cuprous salt, and ferrous salt. These reducing agents may be used alone or in combination of two or more.

In the emulsion polymerization for producing the small polymer particles, the amount of the polymerization initiator, which varies from species to species, is preferably in the range from 0.1 to 5 parts by weight, and more preferably in the range from 0.3 to 3 parts by weight, relative to 100 parts by weight of the polymerizable vinyl monomer employed in the emulsion polymerization.

In the emulsion polymerization for producing the small polymer particles, a chain transfer agent may be added to the aqueous medium. Examples of the chain transfer agent include: mercaptans such as n-octyl mercaptan, tert-octyl mercaptan, n-dodecyl mercaptan, tert-dodecyl mercaptan, and n-hexyl mercaptan; terpenes such as γ-terpinene, and dipentene; halogenated hydrocarbons such as chloroform, carbon tetrachloride, dichloromethane, and dibromomethane; phenolic compounds such as α-methylstyrene dimer; 2,6-di-tert-butyl-4-methylphenol, and styrenated phenol; and allyl compounds such as allyl alcohol. The amount of the chain transfer agent is preferably in the range from 0.1 to 5 parts by weight, and more preferably in the range from 0.3 to 3 parts by weight, relative to 100 parts by weight of the polymerizable vinyl monomer employed in the emulsion polymerization.

In the emulsion polymerization process for producing the small polymer particles, a polymer dispersion stabilizer may be added to the aqueous medium, as necessary, in order to disperse the polymerizable vinyl monomer in the aqueous medium in a more stable state. The polymer dispersion stabilizer may be used alone or in combination of two or more. The amount of the polymer dispersion stabilizer is preferably in the range from 0.01 to 5 parts by weight relative to 100 parts by weight of the polymerizable vinyl monomer employed in the emulsion polymerization.

Regarding the polymerization step in the production method of the present invention, the amount of the small polymer particles to be used (hereinafter referred to as "added amount") is preferably from 0.010 to 0.15 g/m$^2$ per unit surface area of the composite particles obtained by this production method. If the added amount of the small polymer particles is less than 0.010 g/m$^2$, the small polymer particles may insufficiently adhere to the surfaces of the large polymer particles in the composite particles. If the added amount of the small polymer particles is more than 0.15 g/m$^2$, the increase in the amount of the small polymer particles may not be rewarded by corresponding effects, which is uneconomical.

The water-soluble cellulose compound that adsorbs on the small polymer particles is not particularly limited. Examples of the water-soluble cellulose compound include: alkyl celluloses such as methyl cellulose; hydroxyalkyl celluloses such as hydroxymethyl cellulose, hydroxyethyl cellulose, and hydroxypropyl cellulose; and hydroxyalkyl alkylcelluloses such as hydroxyethyl methylcellulose, and hydroxypropyl methylcellulose. Among these compounds, hydroxyalkyl celluloses and hydroxyalkyl alkylcelluloses are preferable, of which hydroxypropyl cellulose (HPC) and hydroxypropyl methylcellulose (HPMC) are more preferable. These compounds may be used alone or in combination of two or more.

It is generally known that hydroxypropyl cellulose (HPC) has a lower critical solution temperature (LCST) of 45° C. Examples of its commercial product include NISSO® HPC series (e.g. "SSL", "SL", "L", "M" and "H") manufactured by NIPPON SODA CO., LTD.

Examples of the commercial product of hydroxypropyl methylcellulose (HPMC) include Metolose® series manufactured by Shin-Etsu Chemical Co., Ltd., in particular, Metolose® 60SH series having the cloud point of 60° C. ("60SH-50", "60SH-4000", and "60SH-10000"), Metolose® 65SH series having the cloud point of 65° C. ("65SH-50", "65-SH-400", "65SH-1500", and "65SH-4000"), and Metolose® 90SH series having the cloud point of 90° C. ("90SH-100", "90SH-400", "90SH-4000", and "90SH-15000").

The adsorption amount of the water-soluble cellulose compound on the small polymer particles is not particularly limited, and may be suitably set according to the specific surface area of the small polymer particles used in the present invention. Preferably, the adsorption amount is 0.05 to 0.5 g per gram of the small polymer particles. The adsorption amount of the water-soluble cellulose compound on the small polymer particles can be measured by [Method for Measuring Adsorption Amount of Water-Soluble Cellulose Compound on Small Polymer Particles] to be Described Later in the Examples.

The production method of the present invention preferably includes, before the polymerization step, an adsorption step of treating the small polymer particles with the water-soluble cellulose compound and thereby causing the water-soluble cellulose compound to adsorb on the surfaces of the small polymer particles.

The method for treating the small polymer particles with the water-soluble cellulose compound, performed in order to cause the water-soluble cellulose compound to adsorb on the surfaces of the small polymer particles, is not particularly limited and may be any of the known methods. For example, as a preferable method, physical adsorption can be performed by allowing the small polymer particles and the water-soluble cellulose compound to coexist in an aqueous medium and physically causing the water-soluble cellulose compound to adsorb on the surfaces of the small polymer particles. In the polymerization step, the water-soluble cellulose compound caused to adsorb on the small polymer particles by this treatment method hardly desorbs from the small polymer particles, and remains in a stable state.

The water-soluble cellulose compound can physically adsorb on the surfaces of the small polymer particles more effectively if the small polymer particles and the water-soluble cellulose compound are allowed to coexist under the temperature condition where the water-soluble cellulose compound has a temperature of (T−15°) C. or higher (where T represents either the lower critical solution temperature (° C.) or the cloud point (° C.) of the water-soluble cellulose compound), and more preferably a temperature between (T−15°) C. and (T+20°) C., inclusive. The water-soluble cellulose compound has only either the lower critical solution temperature or the cloud point, depending on its properties.

The water-soluble cellulose compound that has not adsorbed on the small polymer particles in the adsorption step may be removed by centrifugation and the like before the polymerization step, or may be removed by washing, after the polymerization step, in the purification step of purifying the composite particles obtained in the polymerization step.

In the above adsorption step, the amount of the water-soluble cellulose compound used is preferably from 5 to 50 g, and more preferably from 5 to 30 g, per 100 g of the small polymer particles used. If the used amount of the water-soluble cellulose compound is less than 5 g per 100 g of the small polymer particles used, the amount of the water-soluble cellulose adsorbing on the surfaces of the small polymer particles is insufficient, which may obstruct stable suspension polymerization in the polymerization step and thus is undesirable. If the used amount of the water-soluble cellulose compound is more than 50 g per 100 g of the small polymer particles used, the increase in the amount of the water-soluble cellulose compound is not rewarded by corresponding effects, which is uneconomical and undesirable.

In the polymerization step in the production method of the present invention, it is possible to use an additional suspension stabilizer other than the small polymer particles on which the water-soluble cellulose compound has adsorbed unless it prevents the effects of the present invention. However, following compounds are not suitable as the additional suspension stabilizer to be used in the present invention: inorganic salts such as calcium carbonate, tricalcium phosphate, calcium pyrophosphate, magnesium hydroxide, magnesium pyrophosphate, and colloidal silica; polyvinylpyrrolidone; polyvinyl alcohol; etc. These compounds tend to adhere to the surfaces of the composite particles obtained in the polymerization step, and need to be removed by washing when the composite particles are used for an external preparation, a coating agent, etc. to be described later. Eventually, these compounds hamper the effects of the present invention, and are not suitable as the additional suspension stabilizer to be used in the present invention.
(Surfactant)

In the polymerization step in the production method of the present invention, the monomer mixture containing the polymerizable vinyl monomer may be subjected to the aqueous suspension polymerization in the presence of a surfactant in order to improve the suspension stability further. The surfactant may be any of the non-reactive anionic surfactants, the cationic surfactants, the zwitterionic surfactants, and the non-ionic surfactants, as mentioned above. In the polymerization step, these surfactants may be used alone or in combination of two or more. The species and the amount of the surfactant are suitably selected and adjusted in consideration of the particle size of the composite particles to be obtained and the dispersion stability of the polymerizable monomer during the aqueous suspension polymerization.
(Polymerization Inhibitor)

In the polymerization step in the production method of the present invention, the monomer mixture containing the polymerizable vinyl monomer may be subjected to the aqueous suspension polymerization in the presence of a water-soluble polymerization inhibitor in order to suppress generation of emulsified particles in the aqueous system.

Examples of the water-soluble polymerization inhibitor include nitrites, sulfites, hydroquinones, ascorbic acids, water-soluble vitamins B, citric acid, and polyphenols.
(Other Additives)

In the polymerization step in the production method of the present invention, the monomer mixture containing the polymerizable vinyl monomer may be subjected to the aqueous suspension polymerization in the presence of other additives such as a pigment, a dye, an antioxidant, and an ultraviolet absorber, unless they prevent the effects of the present invention.

Examples of the pigment includes: inorganic pigments such as white lead, red lead, chrome yellow, carbon black, ultramarine, zinc oxide, cobalt oxide, titanium dioxide, iron oxide, titan yellow, and titan black; yellow pigments such as Naples yellow, naphthol yellow S, Hansa yellow 10G, benzidine yellow G, benzidine yellow GR, quinoline yellow lake, permanent yellow NCG, and tartrazine lake; orange pigments such as molybdate orange, permanent orange RK, benzidine orange G, and indanthrene brilliant orange OK; red pigments such as permanent red 4R, lithol red, pyrazolone, red 4R, watching red calcium salt, lake red D, brilliant carmine 6B, eosin lake, rhodamine lake B, alizarin lake, and brilliant carmine B; purple pigments such as fast violet B, methyl violet lake, and dioxane violet; blue pigments such as alkali blue lake, victoria blue lake, phthalocyanine blue, metal-free phthalocyanine blue, partial chloride phthalocyanine blue, fast sky blue, and indanthrene blue BC; green pigments such as pigment green B, malachite green lake, and final yellow green G; and organic pigments such as isoindolinone pigment, quinacridone pigment, perinone pigment, perylene pigment, insoluble azo pigment, soluble azo pigment, and lake pigment.

Examples of the dye include nitroso dye, nitro dye, azo dye, stilbene azo dye, diphenylmethane dye, triphenylmethane dye, xanthene dye, acridine dye, quinoline dye, methine dye, polymethine dye, thiazole dye, indamine dye, indophenol dye, azine dye, oxazine dye, thiazine dye, and sulphur dye.

Examples of the antioxidant include: phenol antioxidants such as 2,6-di-t-butyl-4-methylphenol (BHT), n-octadecyl-3'-(3',5'-di-t-butyl-4'-hydroxyphenyl)propionate, pentaerythrityl-tetrakis[3-(3,5-di-t-butyl-4-hydroxyphenyl)propionate], 1,3,5-tris(3,5-di-tert-butyl-4-hydroxybenzyl) isocyanurate, 1,3,5-trimethyl-2,4,6-tris(3,5-di-t-butyl-4-hydroxybenzyl)benzene, and 3,9-bis[2-{3-(3-t-butyl-4-hydroxy-5-methylphenyl)propionyloxy}-1,1-dimethylethyl]-2,4,8,10-tetraoxaspiro[5,5]undecane; phosphorus antioxidants such as distearyl pentaerythritol diophosphite, tris(2,4-di-t-butylphenyl) phosphite, bis(2,4-di-t-butylphenyl) pentaerythritol diphosphite, tetrakis(2,4-di-t-butylphenyl) 4,4'-biphenylene diphosphonite, bis(2-t-butyl-4-methylphenyl) pentaerythritol diphosphite, and 2,4,8,10-tetra-t-butyl-6-[3-(3-methyl-4-hydroxy-5-t-butylphenyl)propoxy]dibenzo[d,f][1,3,2]dioxaphosphepin; and amine antioxidants such as phenyl-1-naphthylamine, octylated diphenylamine, 4,4-bis(α,α-dimethylbenzyl)diphenylamine, and N,N'-di-2-naphthyl-p-phenylenediamine.

Examples of the ultraviolet absorber include benzophenone ultraviolet absorber, benzotriazole ultraviolet absorber (e.g. "ADK STAB® LA-31" manufactured by ADEKA CORPORATION), and hydroxyphenyl triazine ultraviolet absorber.

(Suspension Polymerization Method)

In the polymerization step in the production method of the present invention, the monomer mixture containing the polymerizable vinyl monomer is subjected to aqueous suspension polymerization in the presence of the small polymer particles on whose surfaces the water-soluble cellulose compound has adsorbed. For example, to effect aqueous suspension polymerization in the polymerization step, the monomer mixture containing the polymerizable vinyl monomer to which any of the polymerizable phosphoric acid monomer and/or the polymerization initiator and/or the polymerization inhibitor and/or the other additives may be added as necessary, is dispersed in an aqueous medium containing the small polymer particles on whose surfaces the water-soluble cellulose compound has adsorbed (the aqueous medium may further contain, as necessary, the surfactant and/or the additional suspension stabilizer).

As the method for dispersing the monomer mixture in the aqueous medium, for example, the following can be suitably used: a method in which the monomer mixture is directly added to the aqueous medium and dispersed as monomer droplets by a stirring force of propeller blades and the like; a method in which the monomer mixture is directly added to the aqueous medium and dispersed therein using a homomixer which is a disperser that generates a high shear force by a rotor and a stator; a method in which the monomer mixture is directly added to the aqueous medium and dispersed therein using an ultrasonic disperser; a method in which the monomer mixture is directly added to the aqueous medium and dispersed therein as droplets by causing collisions between the droplets of the monomer mixture or collisions of the droplets of the monomer mixture against an inner wall of a reaction container using a high-pressure disperser such as Microfluidizer or Nanomizer; and a method in which the monomer mixture is pressed into the aqueous medium through an MPG (micro porous glass) porous membrane. Among the above methods, the method using the high-pressure disperser such as the Microfluidizer or the Nanomizer or the method in which the monomer mixture is caused to pass through the MPG (micro porous glass) porous membrane can make the particle size more uniform and thus are suitable as the method for dispersing the monomer mixture in the aqueous medium.

Then, the aqueous medium in which the monomer mixture is dispersed (i.e. aqueous suspension) is heated to start the suspension polymerization. During the polymerization reaction, it is preferable to stir the aqueous suspension. The stirring may be performed to the extent of, for example, preventing the monomer mixture from surfacing as droplets, or preventing the composite particles produced by the polymerization from settling out.

In the suspension polymerization, the polymerization temperature is preferably set in the range from 30 to 120° C., and more preferably in the range from 40 to 80° C. This polymerization temperature is preferably maintained for a period of 0.1 to 20 hours.

After completion of the polymerization, the obtained composite particles are separated as hydrous cake by suction filtration, centrifugal dehydration, centrifugal separation, and pressure dehydration or a like method. The hydrous cake is washed by water and dried, as needed. The thus obtained composite particles are pulverized, as necessary, and classified to give fine particles having a particle size of 1 to 100 μm.

The size and the shape of the composite particles of the present invention are not particularly limited. According to the above method for producing the composite particles, it is possible to obtain the composite particles with a volume-average particle size of 1 to 100 μm and a coefficient of variation in the particle size of 50% or less.

The average particle size of the composite particles to be obtained can be controlled by adjusting: the mixing condition of the monomer mixture and the aqueous medium; the added amounts of the small polymer particles on whose surfaces the water-soluble cellulose compound has adsorbed, the additional suspension stabilizer, the surfactant, etc.; the stirring condition of the stirrer; the dispersion condition; and the like.

The above-described method for producing the composite particles can provide composite particles which contain the small polymer particles and large polymer particles greater than the small polymer particles. In this method for producing the composite particles, the monomer mixture containing the polymerizable vinyl monomer is subjected to the aqueous suspension polymerization in the presence of the small polymer particles on whose surfaces the water-soluble cellulose compound has adsorbed. Owing to the effect of the water-soluble cellulose compound adsorbing on the surfaces of the small polymer particles, this production method can provide composite particles which contain the large polymer particles made of the polymer of the polymerizable vinyl monomer and the small polymer particles adhering to the surfaces of the large polymer particles (for example, composite particles in which the surfaces of the large polymer particles are at least partially covered by a layer made of the small polymer particles). Besides, this method for producing the composite particles ensures a sufficient suspension stability by performing the aqueous suspension polymerization in the presence of the small polymer particles on whose surfaces the water-soluble cellulose compound has adsorbed. Eventually, this method requires hardly any suspension stabilizers (in particular, water-soluble polymers, inorganic compounds, etc. except the water-soluble cellulose compound) other than the small polymer particles on whose surfaces the water-soluble cellulose compound has adsorbed. Therefore, the method for producing the composite particles can simplify washing of the particles obtained by suspension polymerization.

Preferably, this production method is a method for providing composite particles in which the surfaces of the large polymer particles are entirely covered by a layer made of the small polymer particles. Such a method can improve dispersion stability during the aqueous suspension polymerization to facilitate the production of the composite particles, and can further improve particle flowability of the obtained composite particles.

[Composite Particles]

Figure 2:
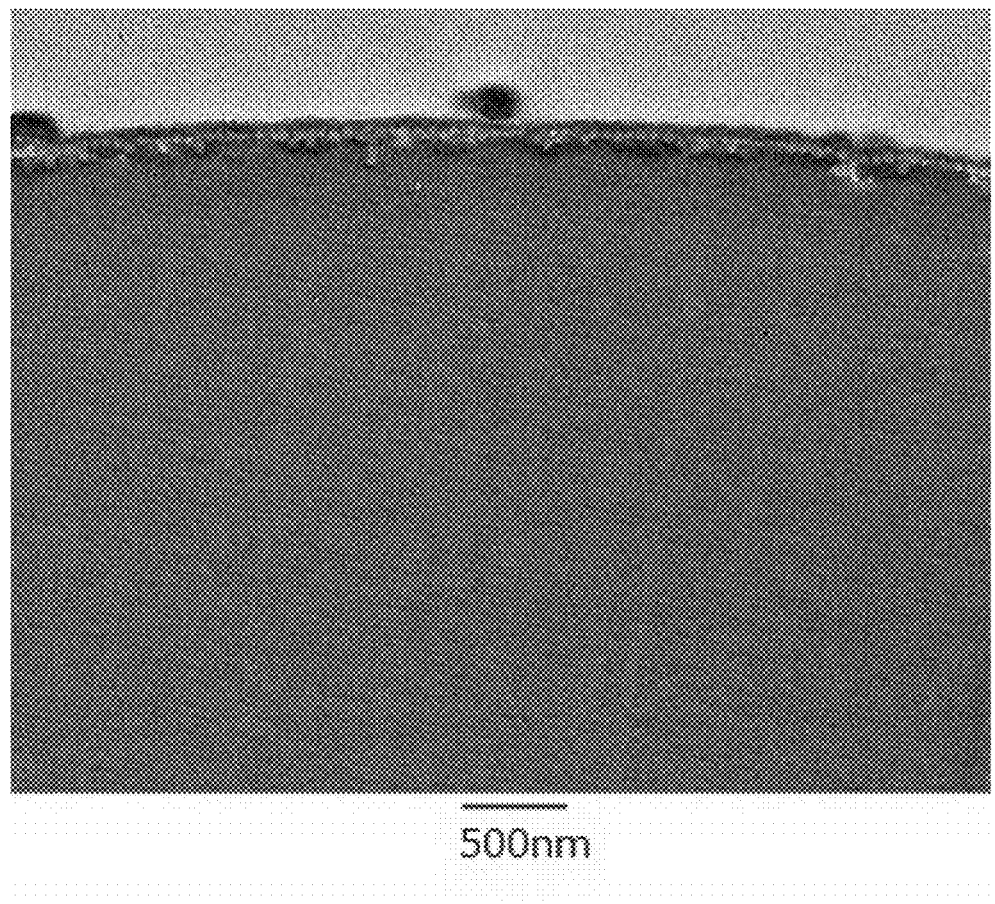
FIG. 2 is a transmission electron microscope (TEM) image showing, on an enlarged scale, a partial cross section of a composite particle obtained in Example 9 of the present invention.

The composite particles of the present invention are obtained by the above-described method for producing the composite particles. Specifically, the composite particles of the present invention contain: the above-mentioned small polymer particles having a particle size of 20 to 500 nm, and preferably a particle size of 20 to 120 nm; the large polymer particles greater than the small polymer particles and made of a polymer of the monomer mixture containing the above-mentioned polymerizable vinyl monomer; and the above-mentioned water-soluble cellulose compound. In the composite particles of the present invention, the small polymer particles adhere to the surfaces of the large polymer particles, and the surfaces of the large polymer particles are at least partially covered by a layer made of the above-described small polymer particles, for example, as shown in FIGS. 1 and 2 (see the particle surfaces in FIGS. 1 and 2). Preferably, in the composite particles of the present invention, the surfaces of the large polymer particles are entirely covered by a layer made of the above-described small polymer particles, for example, as shown in FIG. 2. With these arrangements, it is possible to provide composite particles which have an even better particle flowability and which can be produced easily.

In the composite particles of the present invention, the small polymer particles may adhere to the surfaces of the large polymer particles via the water-soluble cellulose compound, or may adhere directly to the surfaces of the large polymer particles. In other words, in the composite particles of the present invention, the water-soluble cellulose compound may adhere to both of the large polymer particles and the small polymer particles, or may adhere to either of the large polymer particles or the small polymer particles.

In the above-described composite particles of the present invention, the small polymer particles firmly adhere to the surfaces of the large polymer particles because of the water-soluble cellulose compound being contained.

Regarding the composite particles of the present invention, the particle size of the small polymer particles adhering to the surfaces of the large polymer particles can be measured by subjecting the small polymer particles delaminated from the surfaces of the large polymer particles, to the volume-average particle size measurement to be described in the Examples below. Alternatively, regarding the composite particles of the present invention, the particle size of the small polymer particles adhering to the surfaces of the large polymer particles can be also measured by referring to a transmission electron microscope (TEM) image (see FIGS. 1 and 2). For example, among the small polymer particles recognized in a TEM image, particle sizes of 10 randomly selected small polymer particles are obtained from the TEM image, averaged, and taken as the particle size of the small polymer particles.

The quantitative assessment and the qualitative assessment of the structural unit of each monomer (the polymerizable vinyl monomer or the polymerizable phosphoric acid monomer) in the composite particles of the present invention can be performed by known analysis methods such as gas chromatography, liquid chromatography, infrared spectroscopy (IR), and nuclear magnetic resonance spectroscopy (NMR). It should be understood that the weight ratio of each monomer in the monomer mixture used in the polymerization step of the production method of the present invention is substantially equal to the weight ratio of the structural unit of each monomer in the large polymer particles constituting the composite particles of the present invention. It should be also understood that the weight ratio of each monomer in the monomer mixture used in the production of the small polymer particles is substantially equal to the weight ratio of the structural unit of each monomer in the small polymer particles constituting the composite particles of the present invention.

Regarding the composite particles of the present invention, particle flowability is represented by the numerical value of a change in avalanche energy AE before and after the occurrence of an avalanche. A preferable value is in the range from 10 to 45 kJ/kg, which realizes composite particles having a high particle flowability.

[External Preparation]

The composite particles of the present invention can be contained in an external preparation as an additive for improving the use feeling such as lubricity when applying, or as an additive for obscuring skin defects such as pores, freckles and wrinkles by a light diffusion effect. The external preparation of the present invention contains the composite particles of the present invention.

The content of the composite particles in the external preparation of the present invention can be suitably set according to the type of the external preparation, and is preferably in the range from 1 to 80 wt %, and more preferably in the range from 3 to 70 wt %. When the content of the composite particles is less than 1 wt % relative to the total amount of the external preparation, the composite particles may fail to provide a clear effect. When the content of the composite particles is more than 80 wt %, the increase in the content may not be rewarded by corresponding effects, which is undesirable in terms of production cost.

The external preparation of the present invention can be used as, for example, medicines for external use and cosmetics. The type of the medicine for external use is not particularly limited, provided that it is applied to the skin. Specific examples thereof include cream, ointment and emulsion. Examples of the cosmetics include: cleaning cosmetics such as soap, body shampoo, cleansing cream, facial scrub, and toothpaste; make-up cosmetics such as make-up powder, face powder (loose powder, pressed powder, and the like), foundations (powder foundation, liquid foundation, emulsion foundation, and the like), lipstick, lip cream, cheek color, preparations for eyes and brows (eyeshadow, eyeliner, mascara, and the like), and manicure; lotions such as pre-shave lotion, and body lotion; external preparations for body such as body powder, and baby powder; skin care preparations such as lotion, cream, and milk (cosmetic milk); antiperspirants (liquid antiperspirant, solid antiperspirant, cream antiperspirant, and the like), facial masks, hair washing preparations, hair dye, hair styling preparations, aromatic cosmetics, bath preparations, sunscreen preparations, suntan preparations; and shaving cream.

The composite particles to be contained in the external preparation of the present invention may be treated with oil, a surface treatment agent such as a silicone compound and a fluorine compound, organic powder, inorganic powder, and the like.

The oil may be any oil that is generally used for the external preparation. Examples of the oil include: hydrocarbon oils such as liquid paraffin, squalane, vaseline, and paraffin wax; higher fatty acids such as lauric acid, myristic acid, palmitic acid, stearic acid, oleic acid, behenic acid, undecylenic acid, hydroxystearic acid, linoleic acid, lanolin fatty acid, and synthetic fatty acid; ester oils such as glyceryl trioctanoate, propyleneglycol dicaprate, cetyl 2-ethylhexanoate, and isocetyl stearate; waxes such as beeswax, whale wax (spermaceti), lanolin, carnauba wax, and candelilla wax; oils and fats such as linseed oil, cottonseed oil, castor oil, egg-yolk oil, and coconut oil; metal soaps such as zinc stearate, and zinc laurate; higher alcohols such as cetyl alcohol, stearyl alcohol, and oleyl alcohol. The method for treating the composite particles with the oil is not particularly limited, and may be, for example, a dry method or a wet method. In the dry method, the oil is added to the composite particles, and the mixture is stirred by a mixer and the like, so that the oil coats the composite particles. In the wet method, the oil is dissolved under heating in a suitable solvent such as ethanol, propanol, ethyl acetate or hexane, to which the composite particles are added and mixed by stirring. Then, the solvent is removed under reduced pressure or by heating, so that the oil coats the composite particles.

The silicone compound may be any silicone compound that is generally used for the external preparation. Examples of the silicone compound include dimethylpolysiloxane, methylhydrogenpolysiloxane, methylphenylpolysiloxane, acrylic silicone graft polymer, organic silicone resin, and partially crosslinked organopolysiloxane polymer. The method for treating the composite particles with the silicone compound is not particularly limited, and may be, for example, the dry method and the wet method as above. If necessary, the baking treatment may be additionally performed. If the silicone compound is reactive, a catalyst and the like may be appropriately added.

The fluorine compound may be any fluorine compound that is generally used for the external preparation. Examples of the fluorine compound include esters containing perfluoroalkyl groups, perfluoroalkylsilane, perfluoropolyether, and polymers containing perfluoro groups. The method for treating the composite particles with the fluorine compound is not particularly limited, either, and may be, for example, the dry method and the wet method as above. If necessary, the baking treatment may be additionally performed. If the fluorine compound is reactive, a catalyst and the like may be appropriately added.

Examples of the organic powder include: natural polymer compounds such as gum arabic, gum tragacanth, guar gum, locust bean gum, karaya gum, Irish moss, quince seed, gelatin, shellac, rosin, and casein; semisynthetic polymer compounds such as sodium carboxymethyl cellulose, hydroxyethyl cellulose, methyl cellulose, ethyl cellulose, sodium alginate, gum ester, nitro cellulose, hydroxypropyl cellulose, and crystalline cellulose; and resin particles such as polyvinyl alcohol, polyvinylpyrrolidone, sodium polyacrylate, carboxyvinyl polymer, polyvinyl methyl ether, polyamide resin, silicone oil, nylon particles, polymethyl methacrylate particles, crosslinked polystyrene particles, silicone particles, urethane particles, polyethylene particles, and fluororesin particles. Examples of the inorganic powder include iron oxide, ultramarine, iron blue, chromium oxide, chromium hydroxide, carbon black, manganese violet, titanium oxide, zinc oxide, talc, kaolin, mica, calcium carbonate, magnesium carbonate, aluminum silicate, barium silicate, calcium silicate, magnesium silicate, silica, zeolite, barium sulfate, calcined calcium sulfate (calcined plaster), calcium phosphate, hydroxyapatite, and ceramic powder.

These organic powder and inorganic powder may be subjected to surface treatment in advance. The surface treatment can be performed by known surface treatment techniques including: oil treatment by hydrocarbon oil, ester oil, lanolin, etc.; silicone treatment by dimethylpolysiloxane, methylhydrogenpolysiloxane, methylphenylpolysiloxane, etc.; fluorine compound treatment by esters containing perfluoroalkyl groups, perfluoroalkylsilane, perfluoropolyether, polymers containing perfluoroalkyl groups, etc.; silane coupling agent treatment by 3-methacryloxypropyltrimethoxysilane, 3-glycidoxypropyltrimethoxysilane, etc.; titanium coupling agent treatment by isopropyltriisostearoyl titanate, isopropyl tris(dioctylpyrophosphate) titanate, etc.; metal soap treatment, amino acid treatment by acyl glutamic acid, etc.; lecithin treatment by hydrogenated egg-yolk lecithin, etc.; collagen treatment; polyethylene treatment; moisturizing treatment; inorganic compound treatment; mechanochemical treatment; and the like.

The external preparation of the present invention may also contain, depending on its purpose, a main agent or an additive generally used, unless it prevents the effects of the present invention. Examples of the main agent or the additive include water, lower alcohols (alcohols having 5 or fewer carbon atoms), fats, oils and waxes, hydrocarbons, higher fatty acids, higher alcohols, sterols, fatty acid esters, metal soaps, moisturizers, surfactants, polymer compounds, color materials, perfumes, clay minerals, preservatives and germicides, anti-inflammatory agents, antioxidants, ultraviolet absorbers, organic or inorganic composite particles, PH adjusters (e.g. triethanolamine), special additives, and active ingredients of medicines.

Specific examples of the fats, oils and waxes include avocado oil, almond oil, olive oil, cocoa butter, beef tallow, sesame oil, wheat germ oil, safflower oil, shea butter, turtle oil, camellia oil, persic oil, castor oil, grape oil, macadamia nut oil, mink oil, egg-yolk oil, Japan wax, coconut oil, rose hip oil, hydrogenated oil, silicone oil, orange roughy oil, carnauba wax, candelilla wax, whale wax (spermaceti), jojoba oil, montan wax, beeswax, and lanolin.

Specific examples of the hydrocarbons include liquid paraffin, vaseline, paraffin, ceresine, micro crystalline wax, and squalane.

Specific examples of the higher fatty acids include fatty acids having 11 or more carbon atoms such as lauric acid, myristic acid, palmitic acid, stearic acid, oleic acid, behenic acid, undecylenic acid, hydroxystearic acid, linoleic acid, lanolin fatty acid, and synthetic fatty acid.

Specific examples of the higher alcohols include alcohols having 6 or more carbon atoms such as lauryl alcohol, cetyl alcohol, cetostearyl alcohol, stearyl alcohol, oleyl alcohol, behenyl alcohol, lanolin alcohol, hydrogenated lanolin alcohol, hexyldecanol, octyldecanol, isostearyl alcohol, jojoba alcohol, and decyl tetradecanol.

Specific examples of the sterols include cholesterol, dihydrocholesterol, and phytocholesterol.

Specific examples of the fatty acid esters include: linoleic acid esters such as ethyl linoleate; lanolin fatty acid esters such as lanolin fatty acid isopropyl; lauric acid esters such as hexyl laurate; myristic acid esters such as isopropyl myristate, myristyl myristate, cetyl myristate, octyldecyl myristate, and octyldodecyl myristate; oleic acid esters such as decyl oleate, and octyldodecyl oleate; dimethyloctanoic acid esters such as hexyldecyl dimethyloctanoate; isooctane acid esters such as cetyl isooctanoate (cetyl 2-ethylhexanoate); palmitic acid esters such as decyl palmitate; cyclic alcohol fatty acid esters such as glycerin trimyristate, glycerin tri(caprylate or cap rate), propylene glycol dioleate, glycerin triisostearate, glycerin triisooctanoate, cetyl lactate, myristyl lactate, diisostearyl malate, cholesteryl isostearate, and cholesteryl 12-hydroxystearate.

Specific examples of the metal soaps include zinc laurate, zinc myristate, magnesium myristate, zinc palmitate, zinc stearate, aluminum stearate, calcium stearate, magnesium stearate, and zinc undecylenate.

Specific examples of the moisturizers include glycerin, propylene glycol, 1,3-butylene glycol, polyethylene glycol, sodium dl-pyrrolidone carboxylate, sodium lactate, sorbitol, sodium hyaluronate, polyglycerol, xylite, and maltitol.

Specific examples of the surfactant include: anionic surfactants such as higher fatty acid soap, higher alcohol sulfuric acid ester, N-acylglutamate, and phosphoric acid ester salt; cationic surfactants such as amine salt, and quaternaty ammonium salt; amphoteric surfactants such as betaine type, amino acid type, imidazoline type and lecithin; and non-ionic surfactants such as fatty acid monoglyceride, polyethylene glycol, propylene glycol fatty acid ester, sorbitan fatty acid ester (e.g. sorbitan isostearate), sucrose fatty acid ester, polyglycerol fatty acid ester, and ethylene oxide condensate.

Specific examples of the polymer compounds include: natural polymer compounds such as gum arabic, gum tragacanth, guar gum, locust bean gum, karaya gum, Irish moss, quince seed, gelatin, shellac, rosin, and casein; semi-synthetic polymer compounds such as sodium carboxymethyl cellulose, hydroxyethyl cellulose, methyl cellulose, ethyl cellulose, sodium alginate, gum ester, nitro cellulose, hydroxypropyl cellulose, and crystalline cellulose; and synthetic polymer compounds such as resin particles including polyvinyl alcohol, polyvinylpyrrolidone, sodium polyacrylate, carboxyvinyl polymer, polyvinyl methyl ether, polyamide resin, silicone oil, nylon particles, poly(meth)acrylic acid ester particles (e.g. polymethyl methacrylate particles), polystyrene particles, silicone particles, urethane particles, and polyethylene particles. In this application document, the term "(meth)acrylic" means methacrylic or acrylic.

Specific examples of the color materials include: inorganic pigments such as iron oxide (e.g. red iron oxide, yellow iron oxide, and black iron oxide), ultramarine, iron blue, chromium oxide, chromium hydroxide, carbon black, manganese violet, titanium oxide, zinc oxide, talc, kaolin, calcium carbonate, magnesium carbonate, mica, aluminum silicate, barium silicate, calcium silicate, magnesium silicate, silica, zeolite, barium sulfate, calcined calcium sulfate (calcined plaster), calcium phosphate, hydroxyapatite, and ceramic powder; and tar dyes such as azo dye, nitro dye, nitroso dye, xanthene dye, quinoline dye, anthraquinoline dye, indigo dye, triphenylmethane dye, phthalocyanine dye, and pyrene dye.

The powder materials for the polymer compounds or for the color materials may be subjected to surface treatment in advance. The surface treatment can be performed by known surface treatment techniques, as described above.

Specific examples of the clay minerals include components having several functions such as extender pigment and adsorbent: talc, mica (e.g. muscovite), sericite, titanium sericite (sericite coated with titanium oxide), and VEEGUM® manufactured by R. T. Vanderbilt Company, Inc.

Specific examples of the perfumes include anisaldehyde, benzyl acetate, and geraniol. Specific examples of the preservatives and germicides include methylparaben, ethylparaben, propylparaben, benzalkonium, and benzethonium. Specific examples of the antioxidant include dibutylhydroxytoluene, butylhydroxyanisole, propyl gallate, and tocopherol. Specific examples of the anti-inflammatory agents include ε-aminocaproic acid, glycyrrhizic acid, dipotassium glycyrrhizinate, β-glycyrrhetic acid, lysozyme chloride, guaiazulene, and hydrocortisone. These may be used alone or in combination of two or more. Specific examples of the ultraviolet absorbers include: inorganic absorbers such as titanium oxide fine particles, zinc oxide fine particles, cerium oxide fine particles, iron oxide fine particles, and zirconium oxide fine particles; and organic absorbers based on benzoic acid, para-aminobenzoic acid, anthranilic acid, salicylic acid, cinnamic acid, benzophenone, or dibenzoyl methane.

Specific examples of the special additives include hormones such as estradiol, estrone, ethinyl estradiol, cortisone, hydrocortisone, and prednisone; vitamins such as vitamin A, vitamin B, vitamin C, and vitamin E; skin astringents such as citric acid, tartaric acid, lactic acid, aluminum chloride, aluminum potassium sulfate, aluminum chlorohydroxy allantoinate, zinc para-phenolsulfonate, and zinc sulfate; hair growth promoting agents such as cantharis tincture, capsicum tincture, ginger tincture, swertia japonica extract, garlic extract, hinokitiol, carpronium chloride, pentadecanoic acid glyceride, vitamin E, estrogen, and photosensitive elements; whitening agents such as magnesium L-ascorbyl phosphate, and kojic acid.

The external preparation of the present invention, which contains the composite particles of the present invention, has good lubricity.

[Coating Agent]

The composite particles of the present invention can be contained in a coating agent as a coating film softening agent, a flatting agent for coating material, a light diffusing agent, and the like. The coating agent of the present invention contains the composite particles of the present invention.

The coating agent contains, as needed, a binder resin. The binder resin may be a resin that is soluble in an organic solvent or water, or an emulsion-type waterborne resin that is dispersible in water, for each of which known binder resins may be used. Examples of the binder resin include: acrylic resins available under the trade names "Dianal® LR-102" and "Dianal® BR-106" both manufactured by MITSUBISHI RAYON CO., LTD., and the trade name "Medium VM" manufactured by Dainichiseika Color & Chemicals Mfg. Co., Ltd.; alkyd resins; polyester resins; polyurethane resins; chlorinated polyolefin resins; amorphous polyolefin resins; and silicone resins. These binder resins may be suitably selected in consideration of the adhesiveness of the coating agent to a base material to be coated, the usage environment, and the like.

The amount of the composite particles to be blended is suitably adjusted in consideration of the thickness of the coating film formed by the coating agent containing the binder resin, the average particle size of the composite particles, the coating method, the intended use, and the like. The amount of the composite particles is preferably in the range from 1 to 300 parts by weight, and more preferably in the range from 5 to 100 parts by weight, relative to 100 parts by weight of the binder resin. When the amount of the composite particles is less than 1 part by weight relative to 100 parts by weight of the binder resin, the flatting effect may not be sufficient. When the amount of the composite particles is more than 300 parts by weight relative to 100 parts by weight of the binder resin, the viscosity of the coating agent may be too high to cause sufficient dispersion of the composite particles, in which case the appearance of the surface of the coating film may be deteriorated, for example, by microcracks or roughness on the surface of the coating film coated with the coating agent.

The coating agent contains, as needed, a medium. A preferable medium is a solvent that can dissolve the binder resin, or a dispersion medium that can disperse the binder resin. As the dispersion medium or the solvent, it is possible to use both an aqueous medium and an oily medium. Examples of the oily media include: hydrocarbon solvents such as toluene, xylene, and cyclohexane; ketone solvents such as methyl ethyl ketone, and methyl isobutyl ketone; ester solvents such as ethyl acetate, and butyl acetate; and ether solvents such as dioxane, ethylene glycol diethyl ether, and ethylene glycol monobutyl ether. Examples of the aqueous media include water and alcohols (e.g. isopropanol). These media may be used alone or in combination of two or more. The content of the medium in the coating agent is generally in the range from 20 to 60 wt % based on the total amount of the coating agent.

Furthermore, the coating agent may contain other additives such as a curing agent, a colorant (e.g. extender pigment, coloring pigment, metallic pigment, mica pigment powder, and dye), an antistatic agent, a leveling agent, a fluidity modifier, an ultraviolet absorber, and a light stabilizer.

The base material to be coated with the coating agent is not particularly limited, and may be selected according to the intended use.

For example, a base material to be coated for optical use is a glass base material, a transparent base material constituted by a transparent base resin, or the like. When a transparent base material is used as the base material to be coated, it is possible to produce an optical film such as a light diffusion film or an antiglare film by coating the transparent base material with a colorant-free coating agent (a coating agent for light diffusion) and thereby forming a transparent coating film. In this case, the composite particles serve as a light diffusing agent.

Also, when paper is used as the base material to be coated, it is possible to produce matte paper by coating the paper with a colorant-free coating agent (a coating agent for paper) and thereby forming a transparent coating film.

The method for coating the coating agent is not particularly limited, and may be any known method. Examples of the coating methods include a comma direct method, a spin coating method, a spray coating method, a roll coating method, a dipping method, a knife coating method, a curtain flow method, and a laminating method. The coating agent may be diluted with a diluent as needed in order to adjust the viscosity. Examples of the diluents include: hydrocarbon solvents such as toluene, and xylene; ketone solvents such as methyl ethyl ketone, and methyl isobutyl ketone; ester solvents such as ethyl acetate, and butyl acetate; ether solvents such as dioxane, and ethylene glycol diethyl ether; water; and alcohol solvents. These diluents may be used alone or in combination of two or more. For production of an optical film, a coating method that makes the surface of the coating film uneven by the composite particles is preferable.

The above-described coating agent of the present invention, which contains the composite particles of the present invention, can impart light diffusibility to the coating film formed by the coating agent.

[Optical Film]

The optical film of the present invention is obtainable by coating a film-like base material with the coating agent of the present invention. Specific examples of the optical film include a light diffusion film, and an antiglare film.

Specific examples of the base material of the optical film include a glass base material, and a transparent base material made of a transparent base resin.

Examples of the transparent base resin include: an acrylic resin such as polymethyl methacrylate; alkyl (meth)acrylate-styrene copolymer; polycarbonate; polyester such as polyethylene terephthalate (hereinafter referred to as "PET"); polyethylene; polypropylene; and polystyrene. Among these transparent base resins, when an excellent transparency is required of the transparent base resin, it is preferable to use the acrylic resin, alkyl (meth)acrylate-styrene copolymer, polycarbonate, polyester, or polystyrene. These transparent base resins may be used alone or in combination of two or more.

In the optical film, the thickness of the coating film obtainable by applying the coating agent is preferably in the range from 5 to 100 μm.

[Resin Composition]

The resin composition of the present invention contains the composite particles of the present invention and a base resin. The resin composition of the present invention, which contains the composite particles of the present invention and which is excellent in light diffusibility, can be used as a material for a lighting cover (a lighting cover for light emitting diode (LED) lighting, a lighting cover for fluorescent lighting, and the like), and a material for light diffusers such as a light diffusion sheet and a light diffusion plate.

Generally, the base resin is a thermoplastic resin which is different from the polymer components contained in the composite particles. Examples of the thermoplastic resin used as the base resin include an acrylic resin, alkyl (meth)acrylate-styrene copolymer, polycarbonate, polyester, polyethylene, polypropylene, and polystyrene. Among these thermoplastic resins, when an excellent transparency is required of the base resin, it is preferable to use the acrylic resin, alkyl (meth)acrylate-styrene copolymer, polycarbonate, polyester, or polystyrene. These thermoplastic resins may be used alone or in combination of two or more.

The addition rate of the composite particles to the base resin is preferably in the range from 0.1 to 70 parts by weight, and more preferably in the range from 1 to 50 parts by weight, relative to 100 parts by weight of the base resin. When the addition rate of the composite particles to the base resin is less than 0.1 part by weight relative to 100 parts by weight of the base resin, the light diffuser may not have a sufficient light diffusibility. When the addition rate of the composite particles to the base resin is more than 70 parts by weight relative to 100 parts by weight of the base resin, the light diffuser can acquire light diffusibility but may sacrifice its optical transparency.

The method for producing the resin composition is not particularly limited, and can be produced by mixing the composite particles and the base resin by a conventionally known method such as a mechanical pulverizing and mixing method. In the mechanical pulverizing and mixing method, the resin composition can be produced by mixing and stirring the composite particles and the base resin, for example, by means of a mixer such as a Henschel mixer, a V-type mixer, a Turbula mixer, a hybridizer, or a rocking mixer.

[Molded Product]

The molded product of the present invention is obtainable by molding the resin composition of the present invention. Specific examples of the molded product of the present invention include a lighting cover (a lighting cover for light emitting diode (LED) lighting, a lighting cover for fluorescent lighting, and the like), and light diffusers such as a light diffusion sheet and a light diffusion plate.

For example, a molded product having a desired shape can be obtained in the following manner. To start with, the composite particles and the base resin are mixed by the mixer. The mixture is kneaded by a melt-kneader such as an extruder so as to obtain a pellet constituted by the resin composition. Then, the pellet is subjected to extrusion molding, or to injection molding after being melted, to give a molded product having a desired shape.

EXAMPLES

Hereinafter, the present invention is described in detail with reference to the Examples and the Comparative Examples. However, the present invention should not be limited by these Examples. First of all, various measuring methods adopted in the Examples and the Comparative Examples are described.

[Method for Measuring Volume-Average Particle Size of Small Polymer Particles]

The volume-average particle size of the small polymer particles was measured by a laser diffraction particle size analyzer ("LS 13 320" manufactured by Beckman Coulter, Inc.) and a universal liquid module.

To prepare a dispersion for the measurement, 0.1 g of the particles to be measured (the small polymer particles) were dispersed in 10 ml of an aqueous solution of 0.1 wt % non-ionic surfactant, by a touch mixer ("TOUCHMIXER MT-31" manufactured by Yamato Scientific Co., Ltd.) and an ultrasonic cleaner ("ULTRASONIC CLEANER VS-150" manufactured by VELVO-CLEAR Co., Ltd.).

For assessment based on Mie theory, following optical parameters were necessary and were set in the software of the laser diffraction particle size analyzer.

<Parameters>
  Real part of the refractive index B.I. of the liquid (aqueous solution of a non-ionic surfactant)=1.333 (refractive index of water)
  Real part of the refractive index of the solid (particles to be measured)=refractive index of the particles to be measured
  Imaginary part of the refractive index of the solid=0
  Shape factor of the solid=1

The measurement conditions and the measurement procedure were as given below.

<Measurement Conditions>
  Time of measurement: 60 seconds
  Number of measurement: 1
  Pump rate: 50 to 60%
  PIDS relative concentration: about 40 to 55%
  Ultrasonic output: 8

<Measurement Procedure>

Offset measurement, optical axis adjustment, and background measurement were carried out in advance. Thereafter, the dispersion was injected, using a dropper, into the universal liquid module of the laser diffraction particle size analyzer. Measurement was started when the concentration in the universal liquid module reached the above PIDS relative concentration and when the software of the laser diffraction particle size analyzer gave an "OK" sign. During the measurement, the particles to be measured (the small polymer particles) should be kept dispersed in the universal liquid module under pump circulation, and the ultrasonic unit (ULM ULTRASONIC MODULE) should be kept in operation.

The measurement was conducted at room temperature. Using the measurement data and the above-mentioned preset optical parameters, the volume-average particle size (an arithmetic average diameter in the volume-based particle size distribution) of the particles to be measured (the small polymer particles) was calculated by the software of the laser diffraction particle size analyzer.

As for the refractive index of the particles to be measured (the small polymer particles), the refractive index of a polymer constituting the particles (the small polymer particles) was inputted to carry out the measurement. For example, in the case where the polymer constituting the particles to be measured (the small polymer particles) was polymethyl methacrylate (a polymer of the monomer mixture which contained methyl methacrylate as a primary constituent) or polyethyl methacrylate (a polymer of the monomer mixture which contained ethyl methacrylate as a primary constituent), the known refractive index of polymethyl methacrylate and polyethyl methacrylate, 1.495, was inputted. In the case where the polymer constituting the particles to be measured (the small polymer particles) was polystyrene (a polymer of the monomer mixture which contained styrene as a primary constituent), the known refractive index of polystyrene, 1.595, was inputted.

[Method for Measuring Volume Average Particle Size of the Particles and Coefficient of Variation (CV) in Particle Size]

The volume average particle size of the final particles (the composite particles or the polymer particles) obtained in the Examples and the Comparative Examples to be described later was measured by Coulter Multisizer™ 3 (a measurement device manufactured by Beckman Coulter, Inc.). Note that the measurement was performed using the aperture calibrated according to the user's manual of Multisizer™ 3 issued by Beckman Coulter, Inc.

The aperture used for the measurement was appropriately selected in the following manner. When the assumed volume average particle size of the particles to be measured (the composite particles or the polymer particles) was not less than 1 μm and not more than 10 μm, a 50-μm aperture was selected. When the assumed volume average particle size of the particles to be measured (the composite particles or the polymer particles) was more than 10 μm and not more than 30 μm, a 100-μm aperture was selected. When the assumed volume average particle size of the particles to be measured (the composite particles or the polymer particles) was more than 30 μm and not more than 90 μm, a 280-μm aperture was selected. When the assumed volume average particle size of the particles to be measured (the composite particles or the polymer particles) was more than 90 μm and not more than 150 μm, a 400-μm aperture was selected. If the measured volume average particle size was different from the assumed volume average particle size, the aperture should be replaced by the one having an appropriate size, and the volume average particle size was measured again.

When the 50-μm aperture was selected, the "Current" (aperture current) was set to −800 and the "Gain" was set to 4. When the 100-μm aperture was selected, the "Current" (aperture current) was set to −1600 and the "Gain" was set to 2. When the 280-μm aperture or the 400-μm aperture was selected, the "Current" (aperture current) was set to −3200 and the "Gain" was set to 1.

As the measurement sample, the dispersion was prepared by dispersing 0.1 g of the particles to be measured (the composite particles or the polymer particles) in 10 ml of an aqueous solution of 0.1 wt % non-ionic surfactant, by using a touch mixer ("TOUCHMIXER MT-31" manufactured by Yamato Scientific Co., Ltd.) and an ultrasonic cleaner ("ULTRASONIC CLEANER VS-150" manufactured by VELVO-CLEAR Co., Ltd.). A beaker filled with ISOTON® II (electrolyte for measurement, manufactured by Beckman Coulter, Inc.) was set in the measurement unit of the Coulter Multisizer™ 3. The dispersion was dripped while gently stirring the content of the beaker. After an indication of the concentration meter on the main body display of the Coulter Multisizer™ 3 was set to 5 to 10%, the measurement was started. During the measurement, the content of the beaker was gently stirred while avoiding inclusion of air bubbles. The measurement was terminated when 100,000 particles were measured. The volume average particle size of the particles (the composite particles or the polymer particles) was an arithmetic mean of the volume particle size distribution of the 100,000 particles.

The coefficient of variation (CV) in particle size of the transparent particles was calculated by the following formula.

Coefficient of variation in particle size=(standard deviation of the volume-based particle size distribution of the particles to be measured/volume-average particle size of the particles to be measured)×100

[Method for Measuring Specific Surface Area]

The particles to be measured (the composite particles) were weighed out in an amount of 0.25 g and mixed with 0.025 g of sodium dodecylbenzenesulfonate and 50 g of pure water. The mixture was ultrasonically stirred for 10 minutes so as to disperse the particles (the composite particles), thereby giving a measurement sample. The specific surface area of the particles in the measurement sample was measured using a laser diffraction particle size analyzer ("Mastersizer 2000" manufactured by Malvern Instruments Ltd.) under the following measurement conditions.

<Measurement Conditions>
Dispersion medium: water
Analytic model: general purpose
Particle refractive index:
1.495 (composite particles: polymethyl methacrylate)
1.595 (composite particles: polystyrene)
Dispersion medium refractive index: 1.33

[Method for Measuring Adsorption Amount of Water-Soluble Cellulose Compound on Small Polymer Particles]

Using the dispersion medium containing the small polymer particles, obtained by the composite particle production process, on which the water-soluble cellulose compound had adsorbed, the adsorption amount (g) of the water-soluble cellulose compound per gram of the small polymer particles was obtained in the following manner.

(1) Measurement of Adsorption Concentration (g/g) of the Water-Soluble Cellulose Compound Per Gram of the Dispersion Medium First, the adsorption concentration (g/g) of the water-soluble cellulose compound per gram of the dispersion medium (namely, the amount of the water-soluble cellulose compound adsorbing on the small polymer particles, in 1 gram of the dispersion medium) was measured by the following method.

Charged in a closed vessel was 25 g of the dispersion medium containing small polymer particles, obtained by the composite particle production process, on which the water-soluble cellulose compound had adsorbed. To the dispersion medium in the closed vessel, 1 g of salt was added. The closed vessel was shaken until the salt dissolved uniformly in the aqueous medium in the dispersion medium. Then, the content in the closed vessel was transferred into a 50-ml centrifuging tube, and subjected to centrifugal separation for 30 minutes at 25000G by a centrifugal separator (High-Speed Refrigerated Centrifuge, HIMAC CR22GII manufactured by Hitachi High-Technologies Corporation).

To 0.2 g of a supernatant liquid obtained by the centrifugal separation, 0.8 g of ion-exchange water was added to give a dilution (dilution factor: 5 fold). To 1 g of this dilution were added 1 g of an aqueous solution of 5% phenol and 5 ml of concentrated sulfuric acid. The mixture was allowed to leave for 10 minutes, and then for 20 minutes in an aqueous solution at 25° C., thereby giving a measurement sample (phenol-sulfuric acid method).

For this measurement sample, the absorbance at 485 nm was measured with use of a UV-visible spectrophotometer ("UV-visible spectrophotometer UV-2450" manufactured by Shimadzu Corporation), under the following measurement conditions.

<Measurement Conditions>
Measurement mode: single
Photometric value: absorbance
Slit width: 2.0 nm
S/R exchange: normal
Measurement wavelength: 485 nm
Cell: Quartz cell Based on the absorbance obtained by the above measurement and the calibration curve (a curve representing the relationship between the absorbance and the concentration of the water-soluble cellulose compound), the concentration (g/g) of the water-soluble cellulose compound per gram of the supernatant liquid was obtained.

Specifically, the calibration curve was obtained in the following manner. First, three kinds of aqueous solution (standard solutions) having different concentrations were prepared by adding 0.01 g, 0.05 g, and 0.1 g of the water-soluble cellulose compound employed for production of the dispersion medium, respectively, to 100 g of ion-exchange water. Each of the standard solutions (0.2 g each) was diluted with 0.8 g of ion-exchange water (dilution factor: 5 fold). To 1 g of each diluted standard solution were added 1 g of aqueous solution of 5% phenol, and then 5 ml of concentrated sulfuric acid. Each mixture was allowed to stand still for 10 minutes, and further for 20 minutes in an aqueous solution at 25° C., thereby giving measurement samples for the corresponding standard solutions. For these measurement samples, the absorbance was measured with use of a UV-visible spectrophotometer ("UV-visible spectrophotometer UV-2450" manufactured by Shimadzu Corporation), under the above-mentioned measurement conditions. A calibration curve, composed of a straight line and crossing the origin, was drawn by plotting the concentration (g/g) of the water-soluble cellulose compound per gram of the standard solutions (the standard solutions before dilution) on the horizontal axis, and the absorbance of the measurement samples of the standard solutions on the vertical axis. In this regard, the dilution factor of the supernatant liquid and the standard solutions should not be limited to 5 fold.

Based on the thus drawn calibration curve and the absorbance of the measurement samples of the supernatant liquid, the concentration of the water-soluble cellulose compound per gram of the supernatant liquid was obtained.

According to the following calculation formula, the adsorption concentration (g/g) of the water-soluble cellulose compound per gram of the dispersion medium was obtained:

$$C_X = C_Y - C_Z$$

wherein $C_X$ is the adsorption concentration (g/g) of the water-soluble cellulose compound per gram of the dispersion medium;

$C_Y$ is the concentration (g/g) of the water-soluble cellulose compound per gram of the dispersion medium (i.e. the weight of the water-soluble cellulose compound used relative to 1 g of the dispersion medium obtained in the composite particle production process); and $C_Z$ is the concentration (g/g) of the water-soluble cellulose compound per gram of the supernatant liquid.

(2) Calculation of the Adsorption Rate (%) of the Water-Soluble Cellulose Compound According to the following calculation formula, the adsorption rate (%) of the water-soluble cellulose compound was calculated:

$$R = C_X / C_Y \times 100$$

wherein R is the adsorption rate (%);

$C_X$ is the adsorption concentration (g/g) of the water-soluble cellulose compound per gram of the dispersion medium; and $C_Y$ is the concentration (g/g) of the water-soluble cellulose compound per gram of the dispersion medium (i.e. the weight of the water-soluble cellulose compound used relative to 1 g of the dispersion medium obtained in the composite particle production process).

(3) Calculation of the Adsorption Amount (g) of the Water-Soluble Cellulose Compound Per Gram of the Small Polymer Particles According to the following calculation formula, the adsorption amount (g) of the water-soluble cellulose compound per gram of the small polymer particles was calculated:

$$D=(R \times W_H)/W_P$$

wherein D is the adsorption amount (g) of the water-soluble cellulose compound per gram of the small polymer particles;

R is the adsorption rate (%);

$W_H$ is the amount of the water-soluble cellulose compound used for production of the composite particles; and $W_P$ is the weight (g) of the small polymer particles used for production of the composite particles.

[Method for Calculating Added Amount of Small Polymer Particles]

The added amount (g/m$^2$) of the small polymer particles per unit surface area of the particles produced as above was obtained by the calculation formula below, based on the amount of the small polymer particles used for production of the composite particles, the weight of the polymerizable vinyl monomer used, and the specific surface area of the particles (the composite particles) measured by the above-mentioned method for measuring the specific surface area:

$$\text{Added amount}=(W_P/W_m)/X$$

wherein $W_P$ is the weight (g) of the small polymer particles used for production of the composite particles;

Wm is the weight (g) of the polymerizable vinyl monomer used for production of the composite particles; and X is the specific surface area (m$^2$/g) of the particles measured by the method for measuring the specific surface area mentioned above.

[Method for Measuring Evaluation Value Indicating Particle Flowability]

Measurement samples were prepared by weighing out 100 g of the particles to be measured (the composite particles or the polymer particles). For the particles contained in the measurement samples, changes in avalanche energy AE (kJ/kg) before and after the occurrence of avalanches were measured using a powder flow tester ("REVOLUTION powder analyzer" manufactured by Mercury Scientific Inc.) under the following measurement conditions, and taken as a value for evaluating particle flowability. A lower AE value means a higher particle flowability.

<Measurement Conditions>

At a rotational speed of 0.3 rpm, 150 avalanches were measured.

Preparation Example 1

Preparation Example of Small Polymer Particles to be Used in Examples

Into a polymerization vessel equipped with a stirrer, 260 g of water as the aqueous medium, and 1.09 g of polyoxyethylene-1-(allyloxymethyl) alkyl ether sulfate, ammonium salt (trade name "AQUALON® KH-10" manufactured by DKS Co. Ltd.) as the reactive anionic surfactant were supplied. Supplied next into this polymerization vessel was a premixed liquid (the monomer mixture) containing 29 g of methyl methacrylate (MMA) as the polymerizable vinyl monomer (the monofunctional monomer) and 12.6 g of ethylene glycol dimethacrylate (EGDMA) as the polymerizable vinyl monomer (the polyfunctional monomer). The content in the polymerization vessel was heated to 70° C. under stirring at a stirring speed of 200 rpm. After 0.21 g of potassium persulfate as the polymerization initiator was supplied, emulsion polymerization was effected under stirring at 70° C. for 7 hours, thereby giving a dispersion containing crosslinked polymethyl methacrylate particles.

According to the measurement of the volume-average particle size, the crosslinked polymethyl methacrylate particles had a volume-average particle size of 97 nm.

Preparation Example 2

Preparation Example of Small Polymer Particles to be Used in Examples

A dispersion of crosslinked polymethyl methacrylate particles was obtained in the same manner as in Preparation Example 1, except that the amount of methyl methacrylate (MMA) as the polymerizable vinyl monomer (the monofunctional monomer) was changed to 14.7 g, and that the amount of ethylene glycol dimethacrylate (EGDMA) as the polymerizable vinyl monomer (the polyfunctional monomer) was changed to 6.3 g.

According to the measurement of the volume-average particle size, the crosslinked polymethyl methacrylate particles had a volume-average particle size of 40 nm.

Preparation Example 3

Preparation Example of Small Polymer Particles to be Used in Examples

A dispersion of crosslinked polystyrene particles was obtained in the same manner as in Preparation Example 1, except that 29 g of methyl methacrylate (MMA) as the polymerizable vinyl monomer (the monofunctional monomer) was replaced by 29.4 g of styrene (St) as the polymerizable vinyl monomer (the monofunctional monomer).

According to the measurement of the volume-average particle size, the crosslinked polystyrene particles had a volume-average particle size of 80 nm.

Preparation Example 4

Preparation Example of Small Polymer Particles to be Used in Examples

A dispersion of crosslinked polystyrene particles was obtained in the same manner as in Preparation Example 1, except that 29 g of methyl methacrylate (MMA) as the polymerizable vinyl monomer (the monofunctional monomer) was replaced by 14.7 g of styrene (St) as the polymerizable vinyl monomer (the monofunctional monomer), and that the amount of ethylene glycol dimethacrylate (EGDMA) as the polymerizable vinyl monomer (the polyfunctional monomer) was changed to 6.9 g.

According to the measurement of the volume-average particle size, the crosslinked polystyrene particles had a volume-average particle size of 39 nm.

Preparation Example 5

Preparation Example of Small Polymer Particles to be Used in Examples

A dispersion of hydrophilic crosslinked polystyrene particles was obtained in the same manner as in Preparation Example 1, except that 29 g of methyl methacrylate (MMA) as the polymerizable vinyl monomer (the monofunctional monomer) was replaced by 3.1 g of styrene (St) as the polymerizable vinyl monomer (the monofunctional monomer), and 11.6 g of "Blemmer® 50PEP-300" (manufactured by NOF Corporation) as the hydrophilic monofunctional monomer; and that the amount of ethylene glycol dimethacrylate (EGDMA) as the polymerizable vinyl monomer (the polyfunctional monomer) was changed to 6.9 g.

According to the measurement of the volume-average particle size, the hydrophilic crosslinked polystyrene particles had a volume-average particle size of 40 nm.

Example 1: Production Example of Composite Particles

Charged into a polymerization vessel equipped with a stirrer were 50 g of water as the aqueous medium, 0.09 g of Metolose® 65SH-4000 (abbreviation "HPMC (65SH-4000)", hydroxypropylmethylcellulose manufactured by Shin-Etsu Chemical Co., Ltd., with a cloud point of 65° C.) as the water-soluble cellulose compound, and 0.88 g (net weight of the crosslinked polymethyl methacrylate particles) of the dispersion containing the crosslinked polymethyl methacrylate particles having a volume-average particle size of 97 nm obtained as the small polymer particles in Preparation Example 1 above. The ingredients were mixed at 60° C. for 6 hours to give a dispersion medium containing small polymer particles on which the water-soluble cellulose compound had adsorbed. Using this dispersion medium, the adsorption amount of the water-soluble cellulose compound on the small polymer particles (the crosslinked polymethyl methacrylate particles) was measured. The adsorption rate of the water-soluble cellulose compound was 70.3%, which indicated that the amount of the water-soluble cellulose compound adsorbing on the small polymer particles (the crosslinked polymethyl methacrylate particles) was 0.072 g per gram of the small polymer particles (the crosslinked polymethyl methacrylate particles).

Separately, the monomer mixture containing the polymerization initiator was prepared by mixing uniformly and dissolving: 50 g of methyl methacrylate (MMA) and 2.5 g of ethylene glycol dimethacrylate (EDGMA) as the polymerizable vinyl monomers; 0.5 g of 2,2'-azobis(2,4-dimethylvaleronitrile) (ADVN) as the polymerization initiator; and 0.2 g of KAYAMER® PM-21 (abbreviation "PM-21" manufactured by Nippon Kayaku Co., Ltd.) as the polymerizable phosphoric acid monomer.

The monomer mixture containing the polymerization initiator was added to the dispersion medium in the polymerization vessel, and 100 g of water was also added. The mixture was stirred at 4500 rpm for about 5 minutes by a homomixer (High Flex Disperser HG-2 manufactured by SMT CO., LTD.), thus finely dispersing the monomer mixture in the dispersion medium.

Then, stirring was continued at a stirring speed of 100 rpm. After the temperature of the dispersion medium to which the monomer mixture was added reached 55° C., suspension polymerization was performed for 6 hours.

Thereafter, the reaction liquid in the polymerization vessel was cooled to room temperature while being stirred. Subsequently, the reaction liquid was subjected to suction filtration using qualitative filter paper No. 101 ("TOYO Qualitative Filter Paper" manufactured by Advantec Toyo Kaisha, Ltd.), and was washed by ion-exchange water and deliquored, followed by drying in an oven at 60° C. for 6 hours to give composite particles.

The composite particles obtained by the production process of Example 1 had a volume-average particle size of 20.7 μm, a coefficient of variation (CV) of 37.0%, a specific surface area of 0.28 $m^2/g$, and an AE of 26.5 kJ/kg (representing particle flowability). As the small polymer particles, the added amount of the crosslinked polymethyl methacrylate particles having a volume-average particle size of 97 nm obtained in Preparation Example 1 was 0.060 $g/m^2$.

Example 2: Production Example of Composite Particles

Composite particles were obtained in the same manner as in Example 1, except that, as the water-soluble cellulose compound, 0.09 g of Metolose® 65SH-4000 (HPMC (65SH-4000)) was replaced by 0.09 g of Metolose® 65SH-50 (abbreviation "HPMC (655H-50)", hydroxypropylmethylcellulose manufactured by Shin-Etsu Chemical Co., Ltd., with a cloud point of 65° C.).

The composite particles obtained by the production process of Example 2 had a volume-average particle size of 18.8 μm, a coefficient of variation (CV) of 46.0%, a specific surface area of 0.31 $m^2/g$, and an AE of 29.1 kJ/kg (representing particle flowability). As the small polymer particles, the added amount of the crosslinked polymethyl methacrylate particles having a volume-average particle size of 97 nm obtained in Preparation Example 1 was 0.054 $g/m^2$.

Example 3: Production Example of Composite Particles

Composite particles were obtained in the same manner as in Example 1, except that, as the water-soluble cellulose compound, 0.09 g of Metolose® 65SH-4000 (HPMC (65SH-4000)) was replaced by 0.09 g of Metolose® 65SH-50 (abbreviation "HPMC (65SH-50)", hydroxypropylmethylcellulose manufactured by Shin-Etsu Chemical Co., Ltd., with a cloud point of 65° C.); and that, as the small polymer particles, 0.88 g (net weight of the crosslinked polymethyl methacrylate particles) of the aqueous solution of the crosslinked polymethyl methacrylate particles having a volume-average particle size of 97 nm obtained in Preparation Example 1 was replaced by 0.64 g (net weight of the crosslinked polystyrene particles) of the crosslinked polystyrene particles having a volume-average particle size of 80 nm obtained in Preparation Example 3.

The composite particles obtained by the production process of Example 3 had a volume-average particle size of 21.5 μm, a coefficient of variation (CV) of 36.8%, a specific surface area of 0.28 $m^2/g$, and an AE of 25.4 kJ/kg (representing particle flowability). As the small polymer particles, the added amount of the crosslinked polystyrene particles having a volume-average particle size of 80 nm obtained in Preparation Example 3 was 0.044 $g/m^2$.

Example 4: Production Example of Composite Particles

Composite particles were obtained in the same manner as in Example 1, except that, as the water-soluble cellulose compound, 0.09 g of Metolose® 65SH-4000 (HPMC (65SH-4000)) was replaced by 0.09 g of NISSO HPC H (hydroxypropylcellulose manufactured by NIPPON SODA CO., LTD., with a lower critical solution temperature of 45° C.).

The composite particles obtained by the production process of Example 4 had a volume-average particle size of 19.1 µm, a coefficient of variation (CV) of 32.6%, a specific surface area of 0.31 m²/g, and an AE of 28.7 kJ/kg (representing particle flowability). As the small polymer particles, the added amount of the crosslinked polymethyl methacrylate particles having a volume-average particle size of 97 nm obtained in Preparation Example 1 was 0.054 g/m².

Example 5: Production Example of Composite Particles

Composite particles were obtained in the same manner as in Example 1, except that, as the water-soluble cellulose compound, 0.09 g of Metolose® 65SH-4000 (HPMC (65SH-4000)) was replaced by 0.09 g of Metolose® 65SH-400 (abbreviation "HPMC (65SH-400)", hydroxypropylmethylcellulose manufactured by Shin-Etsu Chemical Co., Ltd., with a cloud point of 65° C.); and that, as the polymerizable phosphoric acid monomer, KAYAMER® PM-21 (abbreviation "PM-21" manufactured by Nippon Kayaku Co., Ltd.) was not employed in the preparation of the monomer mixture.

The composite particles obtained by the production process of Example 5 had a volume-average particle size of 21.2 µm, a coefficient of variation (CV) of 34.2%, a specific surface area of 0.28 m²/g, and an AE of 25.8 kJ/kg (representing particle flowability). As the small polymer particles, the added amount of the crosslinked polymethyl methacrylate particles having a volume-average particle size of 97 nm obtained in Preparation Example 1 was 0.060 g/m².

Example 6: Production Example of Composite Particles

Composite particles were obtained in the same manner as in Example 1, except that, as the small polymer particles, 0.88 g (net weight of the crosslinked polymethyl methacrylate particles) of the dispersion containing the crosslinked polymethyl methacrylate particles having a volume-average particle size of 97 nm obtained in Preparation Example 1 was replaced by 0.64 g (net weight of the crosslinked polystyrene particles) of the crosslinked polystyrene particles having a volume-average particle size of 80 nm obtained in Preparation Example 3; that, as the water-soluble cellulose compound, 0.09 g of Metolose® 65SH-4000 (HPMC (65SH-4000)) was replaced by 0.09 g of Metolose® 65SH-400 (abbreviation "HPMC (65SH-400)", hydroxypropylmethylcellulose manufactured by Shin-Etsu Chemical Co., Ltd., with a cloud point of 65° C.); and that, as the polymerizable phosphoric acid monomer, KAYAMER® PM-21 (abbreviation "PM-21" manufactured by Nippon Kayaku Co., Ltd.) was not employed in the preparation of the monomer mixture.

The composite particles obtained by the production process of Example 6 had a volume-average particle size of 22.3 µm, a coefficient of variation (CV) of 37.5%, a specific surface area of 0.26 m²/g, and an AE of 24.3 kJ/kg (representing particle flowability). As the small polymer particles, the added amount of the crosslinked polystyrene particles having a volume-average particle size of 80 nm obtained in Preparation Example 3 was 0.047 g/m².

Example 7: Production Example of Composite Particles

Composite particles were obtained in the same manner as in Example 1, except that, as the water-soluble cellulose compound, 0.09 g of Metolose® 65SH-4000 (HPMC (65SH-4000)) was replaced by 0.09 g of Metolose® 65SH-400 (abbreviation "HPMC (65SH-400)", hydroxypropylmethylcellulose manufactured by Shin-Etsu Chemical Co., Ltd., with a cloud point of 65° C.).

The composite particles obtained by the production process of Example 7 had a volume-average particle size of 21.2 µm, a coefficient of variation (CV) of 48.8%, a specific surface area of 0.28 m²/g, and an AE of 25.8 kJ/kg (representing particle flowability). The added amount of the crosslinked polymethyl methacrylate particles having a volume-average particle size of 97 nm obtained in Preparation Example 1 was 0.060 g/m².

Example 8: Production Example of Composite Particles

Composite particles were obtained in the same manner as in Example 1, except that, as the small polymer particles, 0.88 g (net weight of the crosslinked polymethyl methacrylate particles) of the dispersion containing the crosslinked polymethyl methacrylate particles having a volume-average particle size of 97 nm obtained in Preparation Example 1 was replaced by 0.36 g (net weight of the crosslinked polymethyl methacrylate particles) of the dispersion containing the crosslinked polymethyl methacrylate particles having a volume-average particle size of 40 nm obtained in Preparation Example 2; and that the rotational speed of the homomixer (High Flex Disperser HG-2 manufactured by SMT CO., LTD.) was changed from 4500 rpm to 5500 rpm.

In the dispersion medium obtained by the production process of Example 8 and containing the small polymer particles (the crosslinked polymethyl methacrylate particles) on which the water-soluble cellulose compound had adsorbed, the adsorption rate of the water-soluble cellulose compound was 82.0%, and the adsorption amount of the water-soluble cellulose compound on the small polymer particles (the crosslinked polymethyl methacrylate particles) was 0.205 g per gram of the small polymer particles (the crosslinked polymethyl methacrylate particles). The composite particles obtained by the production process of Example 8 had a volume-average particle size of 16.2 µm, a coefficient of variation (CV) of 36.6%, a specific surface area of 0.36 m²/g, and an AE of 32.6 kJ/kg (representing particle flowability). The added amount of the crosslinked polymethyl methacrylate particles having a volume-average particle size of 40 nm obtained in Preparation Example 2 was 0.019 g/m².

Example 9: Production Example of Composite Particles

Composite particles were obtained in the same manner as in Example 1, except that, as the water-soluble cellulose compound, 0.09 g of Metolose® 65SH-4000 (HPMC (65SH-4000)) was replaced by 0.09 g of Metolose® 65SH-50 (abbreviation "HPMC (65SH-50)", hydroxypropylmethylcellulose manufactured by Shin-Etsu Chemical Co., Ltd., with a cloud point of 65° C.); that, as the polymerizable vinyl monomers, 50 g of methyl methacrylate (MMA) and 2.5 g of ethylene glycol dimethacrylate (EGDMA) were replaced by 50 g of styrene (St) and 2.5 g of ethylene glycol dimethacrylate (EGDMA); and that 0.88 g (net weight of the crosslinked polymethyl methacrylate particles) of the dispersion containing the crosslinked polymethyl methacrylate particles having a volume-average particle size of 97 nm obtained in Preparation Example 1 was replaced by 0.41 g (net weight of the crosslinked polymethyl methacrylate particles) of the dispersion containing the crosslinked polymethyl methacrylate particles having a volume-average particle size of 40 nm obtained in Preparation Example 2.

The composite particles obtained by the production process of Example 9 had a volume-average particle size of 20.2 μm, a coefficient of variation (CV) of 40.7%, a specific surface area of 0.29 m$^2$/g, and an AE of 27.2 kJ/kg (representing particle flowability). As the small polymer particles, the added amount of the crosslinked polymethyl methacrylate particles having a volume-average particle size of 40 nm obtained in Preparation Example 2 was 0.027 g/m$^2$.

Example 10: Production Example of Composite Particles

Composite particles were obtained in the same manner as in Example 1, except that, as the small polymer particles, 0.88 g (net weight of the crosslinked polymethyl methacrylate particles) of the dispersion containing the crosslinked polymethyl methacrylate particles having a volume-average particle size of 97 nm obtained in Preparation Example 1 was replaced by 0.35 g (net weight of the crosslinked polystyrene particles) of the dispersion containing the crosslinked polystyrene particles having a volume-average particle size of 39 nm obtained in Preparation Example 4; and that, as the polymerizable vinyl monomers, 50 g of methyl methacrylate (MMA) and 2.5 g of ethylene glycol dimethacrylate (EGDMA) were replaced by 50 g of styrene (St) and 2.5 g of ethylene glycol dimethacrylate (EGDMA).

The composite particles obtained by the production process of Example 10 had a volume-average particle size of 20.9 μm, a coefficient of variation (CV) of 33.8%, a specific surface area of 0.28 m$^2$/g, and an AE of 26.2 kJ/kg (representing particle flowability). As the small polymer particles, the added amount of the crosslinked polystyrene particles having a volume-average particle size of 39 nm obtained in Preparation Example 4 was 0.024 g/m$^2$.

Example 11: Production Example of Composite Particles

Composite particles were obtained in the same manner as in Example 1, except that, as the polymerizable vinyl monomers, 50 g of methyl methacrylate (MMA) and 2.5 g of ethylene glycol dimethacrylate (EGDMA) were replaced by 50 g of methyl methacrylate (MMA) and 2.5 g of trimethylolpropane triacrylate (TMPTA); and that, as the polymerization initiator, 0.5 g of 2,2'-azobis(2,4-dimethylvaleronitrile) (ADVN) was replaced by 0.5 g of lauroyl peroxide (LPO).

In the dispersion medium obtained by the production process of Example 11 and containing the small polymer particles (the crosslinked polymethyl methacrylate particles) on which the water-soluble cellulose compound had adsorbed, the adsorption rate of the water-soluble cellulose compound was 70.3%, and the adsorption amount of the water-soluble cellulose compound on the small polymer particles (the crosslinked polymethyl methacrylate particles) was 0.072 g per gram of the small polymer particles (the crosslinked polymethyl methacrylate particles). The composite particles obtained by the production process of Example 11 had a volume-average particle size of 17.3 μm, a coefficient of variation (CV) of 42.6%, a specific surface area 0.34 m$^2$/g, and an AE of 31.1 kJ/kg (representing particle flowability). As the small polymer particles, the added amount of the crosslinked polymethyl methacrylate particles having a volume-average particle size of 97 nm obtained in Preparation Example 1 was 0.049 g/m$^2$.

Example 12: Production Example of Composite Particles

Composite particles were obtained in the same manner as Example 1, except that, as the small polymer particles, 0.88 g (net weight of the crosslinked polymethyl methacrylate particles) of the dispersion containing the crosslinked polymethyl methacrylate particles having a volume-average particle size of 97 nm obtained in Preparation Example 1 was replaced by 0.31 g (net weight of the crosslinked polystyrene particles) of the dispersion containing the crosslinked polystyrene particles having a volume-average particle size of 39 nm obtained in Preparation Example 4; that, as the polymerizable phosphoric acid monomer, KAYAMER® PM-21 (abbreviation "PM-21" manufactured by Nippon Kayaku Co., Ltd.) was not employed in the preparation of the monomer mixture; and that the rotational speed of the homomixer (High Flex Disperser HG-2 manufactured by SMT CO., LTD.) was changed from 4500 rpm to 5500 rpm.

The composite particles obtained by the production process of Example 12 had a volume-average particle size of 14.4 μm, a coefficient of variation (CV) of 32.5%, a specific surface area of 0.41 m$^2$/g, and an AE of 35.0 kJ/kg (representing particle flowability). As the small polymer particles, the added amount of the crosslinked polystyrene particles having a volume-average particle size of 39 nm obtained in Preparation Example 4 was 0.014 g/m$^2$.

Example 13: Production Example of Composite Particles

Composite particles were obtained in the same manner as in Example 1, except that, as the water-soluble cellulose compound, 0.09 g of Metolose® 65SH-4000 (HPMC (65SH-4000)) was replaced by 0.09 g of Metolose® 65SH-400 (abbreviation "HPMC (65SH-400)", hydroxypropylmethylcellulose manufactured by Shin-Etsu Chemical Co., Ltd., with a cloud point of 65° C.); that 0.88 g (net weight of the crosslinked polymethyl methacrylate particles) of the dispersion containing the crosslinked polymethyl methacrylate particles having a volume-average particle size of 97 nm obtained in Preparation Example 1 was replaced by 0.36 g (net weight of the crosslinked polymethyl methacrylate particles) of the dispersion containing the crosslinked polymethyl methacrylate particles having a volume-average particle size of 40 nm obtained in Preparation Example 2; and that, as the polymerizable phosphoric acid monomer, 0.2 g of KAYAMER® PM-21 (abbreviation "PM-21" manufactured by Nippon Kayaku Co., Ltd.) was replaced by 0.2 g of Adeka Reasoap® PP-70 (abbreviation "PP-70" manufactured by ADEKA CORPORATION) in the preparation of the monomer mixture.

The composite particles obtained by the production process of Example 13 had a volume-average particle size of 16.7 μm, a coefficient of variation (CV) of 46.6%, a specific surface area of 0.35 m$^2$/g, and an AE of 31.9 kJ/kg (representing particle flowability). As the small polymer particles, the added amount of the crosslinked polymethyl methacrylate particles having a volume-average particle size of 40 nm obtained in Preparation Example 2 was 0.020 g/m$^2$.

Example 14: Production Example of Composite Particles

Composite particles were obtained in the same manner as in Example 1, except that the amount of Metolose® 65SH- 4000 (HPMC (65SH-4000)) was changed to 0.36 g; that, as the small polymer particles, the amount of the dispersion containing the crosslinked polymethyl methacrylate particles having a volume-average particle size of 97 nm obtained in Preparation Example 1 was changed to 3.51 g (net weight of the crosslinked polymethyl methacrylate particles); and that the rotational speed of the homomixer (High Flex Disperser HG-2 manufactured by SMT CO., LTD.) was changed from 4500 rpm to 8000 rpm.

The composite particles obtained by the production process of Example 14 had a volume-average particle size of 8.2 μm, a coefficient of variation of 46.0%, a specific surface area of 0.71 m$^2$/g, and an AE of 42.4 kJ/kg (representing particle flowability). As the small polymer particles, the added amount of the crosslinked polymethyl methacrylate particles having a volume-average particle size of 97 nm obtained in Preparation Example 1 was 0.094 g/m$^2$.

Example 15: Production Example of Composite Particles

Composite particles were obtained in the same manner as in Example 1, except that, as the small polymer particles, 0.88 g (net weight of the crosslinked polymethyl methacrylate particles) of the dispersion containing the crosslinked polymethyl methacrylate particles having a volume-average particle size of 97 nm obtained in Preparation Example 1 was replaced by 0.30 g (net weight of the crosslinked polystyrene particles) of the dispersion containing the crosslinked polystyrene particles having a volume-average particle size of 39 nm obtained in Preparation Example 4; that the rotational speed and the stirring period of the homomixer (High Flex Disperser HG-2 manufactured by SMT CO., LTD.) was changed from 4500 rpm and 5 minutes to 2000 rpm and 1 minute, respectively; and that the stirring speed during the suspension polymerization was changed from 100 rpm to 200 rpm.

The composite particles obtained by the production process of Example 15 had a volume-average particle size of 45.6 μm, a coefficient of variation (CV) of 40.6%, a specific surface area of 0.13 m$^2$/g, and an AE of 13.1 kJ/kg (representing particle flowability). As the small polymer particles, the added amount of the crosslinked polystyrene particles having a volume-average particle size of 39 nm obtained in Preparation Example 4 was 0.044 g/m$^2$.

Example 16: Production Example of Composite Particles

Composite particles were obtained in the same manner as in Example 1, except that, as the small polymer particles, 0.88 g (net weight of the crosslinked polymethyl methacrylate particles) of the dispersion containing the crosslinked polymethyl methacrylate particles having a volume-average particle size of 97 nm obtained in Preparation Example 1 was replaced by 0.36 g (net weight of the hydrophilic crosslinked polystyrene particles) of the dispersion containing the hydrophilic crosslinked polystyrene particles having a volume-average particle size of 40 nm obtained in Preparation Example 5.

The composite particles obtained by the production process of Example 16 had a volume-average particle size of 20.2 μm, a coefficient of variation (CV) of 36.6%, a specific surface area of 0.30 m$^2$/g, and an AE of 27.2 kJ/kg (representing particle flowability). The added amount of the hydrophilic crosslinked polystyrene particles having a volume-average particle size of 40 nm obtained in Preparation Example 5 was 0.023 g/m$^2$.

Example 17: Production Example of Composite Particles

Composite particles were obtained in the same manner as in Example 2, except that, as the small polymer particles, 0.88 g (net weight of the crosslinked polymethyl methacrylate particles) of the dispersion containing the crosslinked polymethyl methacrylate particles having a volume-average particle size of 97 nm obtained in Preparation Example 1 was replaced by 2.32 g (net weight of the hydrophilic crosslinked polystyrene particles) of the dispersion containing the hydrophilic crosslinked polystyrene particles having a volume-average particle size of 40 nm obtained in Preparation Example 5; and that the amount of Metolose® 65SH-50 (HPMC (65SH-50)) was changed to 0.24 g.

The composite particles obtained by the production process of Example 17 had a volume-average particle size of 5.5 μm, a coefficient of variation (CV) of 38.0%, a specific surface area of 1.09 m$^2$/g, and an AE of 43.4 kJ/kg (representing particle flowability). The added amount of the hydrophilic crosslinked polystyrene particles having a volume-average particle size of 40 nm obtained in Preparation Example 5 was 0.041 g/m$^2$.

Comparative Example 1

Comparative Production Example of Composite Particles

Suspension polymerization was attempted in the same manner as in Example 1, except that, as the water-soluble cellulose compound, 0.09 g of Metolose® 65SH-4000 (HPMC (655H-4000)) was replaced by 0.09 g of Metolose® 65SH-400 (abbreviation "HPMC (655H-400)", hydroxypropylmethylcellulose manufactured by Shin-Etsu Chemical Co., Ltd., with a cloud point of 65° C.); that, as the small polymer particles, 0.88 g (net weight of the crosslinked polymethyl methacrylate particles) of the dispersion containing the crosslinked polymethyl methacrylate particles having a volume-average particle size of 97 nm obtained in Preparation Example 1 was not employed; and that, as the polymerizable phosphoric acid monomer, KAYAMER® PM-21 (abbreviation "PM-21" manufactured by Nippon Kayaku Co., Ltd.) was not employed in the preparation of the monomer mixture. Despite the attempt, droplets of the monomer mixture in the dispersion medium were so unstable that the polymer particles could not be obtained.

Comparative Example 2

Production Example of Composite Particles

Suspension polymerization was attempted in the same manner as in Example 1, except that, as the small polymer particles, 0.88 g (net weight of the crosslinked polymethyl methacrylate particles) of the dispersion containing the crosslinked polymethyl methacrylate particles having a volume-average particle size of 97 nm obtained in Preparation Example 1 was not employed; that, as the polymerizable vinyl monomers, 50 g of methyl methacrylate (MMA) and 2.5 g of ethylene glycol dimethacrylate (EGDMA) were replaced by 50 g of styrene (St) and 2.5 g of ethylene glycol dimethacrylate (EGDMA); and that, as the polymerizable phosphoric acid monomer, KAYAMER® PM-21 (abbreviation "PM-21" manufactured by Nippon Kayaku Co., Ltd.) was not employed in the preparation of the monomer mixture. Despite the attempt, droplets of the monomer mixture in the dispersion medium were so unstable that polymer particles could not be obtained.

Comparative Example 3

Comparative Production Example of Composite Particles

Suspension polymerization was attempted in the same manner as in Example 1, except that, as the water-soluble cellulose compound Metolose® 65SH-4000 (HPMC (65SH-4000)) was not employed; and that, as the polymerizable phosphoric acid monomer, KAYAMER® PM-21 (abbreviation "PM-21" manufactured by Nippon Kayaku Co., Ltd.) was not employed in the preparation of the monomer mixture. Despite the attempt, droplets of the monomer mixture in the dispersion medium were so unstable that composite particles could not be obtained.

Comparative Example 4

Comparative Production Example of Composite Particles

Suspension polymerization was attempted in the same manner as in Example 1, except that, as the water-soluble cellulose compound, Metolose® 65SH-4000 (HPMC (65SH-4000)) was not employed; that, as the small polymer particles, 0.88 g (net weight of the crosslinked polymethyl methacrylate particles) of the dispersion containing the crosslinked polymethyl methacrylate particles having a volume-average particle size of 97 nm obtained in Preparation Example 1 was replaced by 0.64 g (net weight of the crosslinked polystyrene particles) of the dispersion containing the crosslinked polystyrene particles having a volume-average particle size of 80 nm obtained in Preparation Example 3; and that, as the polymerizable phosphoric acid monomer, KAYAMER® PM-21 (abbreviation "PM-21" manufactured by Nippon Kayaku Co., Ltd.) was not employed in the preparation of the monomer mixture. Despite the attempt, droplets of the monomer mixture in the dispersion medium were so unstable that composite particles could not be obtained.

Comparative Example 5

Comparative Production Example of Composite Particles

Production of composite particles was attempted in the same manner as in Example 1, except that, as the water-soluble cellulose compound, 0.09 g of Metolose® 65SH-4000 (HPMC (65SH-4000)) was replaced by 0.09 g of Metolose® 65SH-400 (abbreviation "HPMC (65SH-400)", hydroxypropylmethylcellulose manufactured by Shin-Etsu Chemical Co., Ltd., with a cloud point of 65° C.); and that the dispersion medium containing the water-soluble cellulose compound and the crosslinked polymethyl methacrylate particles having a volume-average particle size of 97 nm obtained in Preparation Example 1 was prepared by feeding water, the dispersion which contained the crosslinked polymethyl methacrylate particles having a volume-average particle size of 97 nm obtained in Preparation Example 1, and the water-soluble cellulose compound into a polymerization vessel equipped with a stirrer, but without mixing the content at 60° C. for 24 hours (i.e. no treatment for causing the water-soluble cellulose compound to adsorb on the small polymer particles). Despite the attempt, particles coalesced with each other during the polymerization, and composite particles could not be obtained.

Comparative Example 6

Production Example of Polymer Particles for Comparison

Into a polymerization vessel, 150 g of water as the aqueous medium, and 1.95 g of polyvinyl alcohol (PVA) (trade name "Gohsenol® GL-05" manufactured by The Nippon Synthetic Chemical Industry Co., Ltd.) as the dispersant were fed to give a dispersion medium.

Separately, the monomer mixture containing the polymerization initiator was prepared by mixing uniformly and dissolving 50 g of methyl methacrylate (MMA) and 2.5 g of ethylene glycol dimethacrylate (EGDMA) as the polymerizable vinyl monomers, and 0.5 g of 2,2'-azobis(2,4-dimethylvaleronitrile) (ADVN) as the polymerization initiator.

The monomer mixture containing the polymerization initiator was added to the dispersion medium in the polymerization vessel, and 100 g of water was added further. The mixture was stirred at a rotational speed (stirring speed) of 6000 rpm for about 5 minutes by a homomixer (trade name "High Flex Disperser HG92" manufactured by SMT CO., LTD.), until the monomer mixture was finely dispersed in the dispersion medium. Thereafter, stirring was continued at a rotational speed of 100 rpm. After the temperature of the dispersion medium to which the monomer mixture was added reached 55° C., suspension polymerization was performed for 6 hours.

Later, the reaction liquid in the polymerization vessel was cooled to room temperature while being stirred. Subsequently, the reaction liquid was subjected to suction filtration using qualitative filter paper No. 101 ("TOYO Qualitative Filter Paper" manufactured by Advantec Toyo Kaisha, Ltd.), and was washed by ion-exchange water and deliquored, followed by drying in an oven at 60° C. for 6 hours to give spherical polymer particles.

The polymer particles obtained by the production process of Comparative Example 6 had a volume-average particle size of 20.1 µm, a coefficient of variation (CV) of 46.0%, and an AE of 59.0 kJ/kg (representing particle flowability).

Comparative Example 7

Production Example of Polymer Particles for Comparison

Spherical polymer particles were obtained in the same manner as in Comparative Example 6, except that the rotational speed of the homomixer was changed from 6000 rpm to 8000 rpm.

The polymer particles obtained by the production process of Comparative Example 7 had a volume-average particle size of 8.1 μm, a coefficient of variation (CV) of 43.0%, and an AE of 56.8 kJ/kg (representing particle flowability).

Comparative Example 8

Production Example of Polymer Particles for Comparison

Spherical polymer particles were obtained in the same manner as in Comparative Example 6, except that the rotational speed of the homomixer was changed from 6000 rpm to 10000 rpm.

The polymer particles obtained by the production process of Comparative Example 8 had a volume-average particle size of 5.5 μm, and a coefficient of variation (CV) of 41.1%. The AE (representing particle flowability) could not be measured because too many particles attached to the inside of the drum of the measuring device.

Regarding Examples 1 to 17 and Comparative Examples 1 to 8, Tables 1 to 3 show the amounts of the materials used for the production; the measurement results of the volume-average particle sizes of the small polymer particles used for the production; the measurement results of the volume-average particle sizes, specific surface areas, and coefficients of variation (CV) for the composite particles or the polymer particles obtained by the production; the calculation results of the added amounts of the small polymer particles; and the AE (representing particle flowability). In Tables 1 to 3, "PMMA97" means the crosslinked polymethyl methacrylate particles having a volume-average particle size of 97 nm obtained in Preparation Example 1; "PMMA40" means the crosslinked polymethyl methacrylate particles having a volume-average particle size of 40 nm obtained in Preparation Example 2; "PS80" means the crosslinked polystyrene particles having a volume-average particle size of 80 nm obtained in Preparation Example 3; "PS39" means the crosslinked polystyrene particles having a volume-average particle size of 39 nm obtained in Preparation Example 4; and "PS40" means the hydrophilic crosslinked polystyrene particles having a volume-average particle size of 40 nm obtained in Preparation Example 5.

TABLE 1

| | | | Examples | | | | | | | | | |
|---|---|---|---|---|---|---|---|---|---|---|---|---|
| | | | 1 | 2 | 3 | 4 | 5 | 6 | 7 | 8 | 9 | 10 |
| Materials (g) | Polymerizable vinyl monomer | MMA | 50 | 50 | 50 | 50 | 50 | 50 | 50 | 50 | — | — |
| | | EGDMA | 2.5 | 2.5 | 2.5 | 2.5 | 2.5 | 2.5 | 2.5 | 2.5 | 2.5 | 2.5 |
| | | TMPTA | — | — | — | — | — | — | — | — | — | — |
| | | St | — | — | — | — | — | — | — | — | 50 | 50 |
| | Polymerizable phosphoric acid monomer | PM-21 | 0.2 | 0.2 | 0.2 | 0.2 | — | — | 0.2 | 0.2 | 0.2 | 0.2 |
| | | PP-70 | — | — | — | — | — | — | — | — | — | — |
| | Polymerization initiator | ADVN | 0.5 | 0.5 | 0.5 | 0.5 | 0.5 | 0.5 | 0.5 | 0.5 | 0.5 | 0.5 |
| | | LPO | — | — | — | — | — | — | — | — | — | — |
| | Small polymer particles | PMMA97 | 0.88 | 0.88 | — | 0.88 | 0.88 | — | 0.88 | — | — | — |
| | | PMMA40 | — | — | — | — | — | — | — | 0.36 | 0.41 | — |
| | | PS80 | — | — | 0.64 | — | — | 0.64 | — | — | — | — |
| | | PS39 | — | — | — | — | — | — | — | — | — | 0.35 |
| | | PS40 | — | — | — | — | — | — | — | — | — | — |
| | Water-soluble cellulose compound | HPMC (65SH-50) | — | 0.09 | 0.09 | — | — | — | — | — | 0.09 | — |
| | | HPMC (65SH-400) | — | — | — | — | 0.09 | 0.09 | 0.09 | — | — | — |
| | | HPMC (65SH-4000) | 0.09 | — | — | — | — | — | — | 0.09 | — | 0.09 |
| | | NISSO HPC H | — | — | — | 0.09 | — | — | — | — | — | — |
| | Dispersant | PVA (Gohsenol GL-05) | — | — | — | — | — | — | — | — | — | — |
| Measurement results | Small polymer particles | Volume-average particle size (nm) | 97 | 97 | 80 | 97 | 97 | 80 | 97 | 40 | 40 | 39 |
| | Composite particles or polymer particles | Volume-average particle size (μm) | 20.7 | 18.8 | 21.5 | 19.1 | 21.2 | 22.3 | 21.2 | 16.2 | 20.2 | 20.9 |
| | | CV (%) | 37.0 | 46.0 | 36.8 | 32.6 | 34.2 | 37.5 | 48.8 | 36.6 | 40.7 | 33.8 |
| | | Specific surface area (m$^2$/g) | 0.28 | 0.31 | 0.28 | 0.31 | 0.28 | 0.26 | 0.28 | 0.36 | 0.29 | 0.28 |
| | | Added amount (g/m$^2$) | 0.060 | 0.054 | 0.044 | 0.054 | 0.060 | 0.047 | 0.060 | 0.019 | 0.027 | 0.024 |
| | | AE (KJ/kg) | 26.5 | 29.1 | 25.4 | 28.7 | 25.8 | 24.3 | 25.8 | 32.6 | 27.2 | 26.2 |

TABLE 2

| | | | Examples | | | | | | |
|---|---|---|---|---|---|---|---|---|---|
| | | | 11 | 12 | 13 | 14 | 15 | 16 | 17 |
| Materials (g) | Polymerizable vinyl monomer | MMA | 50 | 50 | 50 | 50 | 50 | 50 | 50 |
| | | EGDMA | — | 2.5 | 2.5 | 2.5 | 2.5 | 2.5 | 2.5 |
| | | TMPTA | 2.5 | — | — | — | — | — | — |
| | | St | — | — | — | — | — | — | — |
| | Polymerizable phosphoric acid monomer | PM-21 | 0.2 | — | — | 0.2 | 0.2 | 0.2 | 0.2 |
| | | PP-70 | — | — | 0.2 | — | — | — | — |
| | Polymerization | ADVN | — | 0.5 | 0.5 | 0.5 | 0.5 | 0.5 | 0.5 |

TABLE 2-continued

|  |  |  | Examples | | | | | | |
|---|---|---|---|---|---|---|---|---|---|
|  |  |  | 11 | 12 | 13 | 14 | 15 | 16 | 17 |
|  | initiator | LPO | 0.5 | — | — | — | — | — | — |
|  | Small polymer particles | PMMA97 | 0.88 | — | — | 3.51 | — | — | — |
|  |  | PMMA40 | — | — | 0.36 | — | — | — | — |
|  |  | PS80 | — | — | — | — | — | — | — |
|  |  | PS39 | — | 0.31 | — | — | 0.3 | — | — |
|  |  | PS40 | — | — | — | — | — | 0.36 | 2.32 |
|  | Water-soluble cellulose compound | HPMC (65SH-50) | — | — | — | — | — | — | 0.24 |
|  |  | HPMC (65SH-400) | — | — | 0.09 | — | — | 0.09 | — |
|  |  | HPMC (65SH-4000) | 0.09 | 0.09 | — | 0.36 | 0.09 | — | — |
|  |  | NISSO HPC H | — | — | — | — | — | — | — |
|  | Dispersant | PVA (Gohsenol GL-05) | — | — | — | — | — | — | — |
| Measurement results | Small polymer particles | Volume-average particle size (nm) | 97 | 39 | 40 | 97 | 39 | 40 | 40 |
|  | Composite particles or polymer particles | Volume-average particle size (nm) | 17.3 | 14.4 | 16.7 | 8.2 | 45.6 | 20.2 | 5.5 |
|  |  | CV (%) | 42.6 | 32.5 | 46.6 | 46.0 | 40.6 | 36.6 | 38.0 |
|  |  | Specific surface area (m$^2$/g) | 0.34 | 0.41 | 0.35 | 0.71 | 0.13 | 0.30 | 1.09 |
|  |  | Added amount (g/m$^2$) | 0.049 | 0.014 | 0.020 | 0.094 | 0.044 | 0.023 | 0.041 |
|  |  | AE (KJ/kg) | 31.1 | 35.0 | 31.9 | 42.4 | 13.1 | 27.2 | 43.4 |

TABLE 3

|  |  |  | Comparative Examples | | | | | | | |
|---|---|---|---|---|---|---|---|---|---|---|
|  |  |  | 1 | 2 | 3 | 4 | 5 | 6 | 7 | 8 |
| Materials (g) | Polymerizable vinyl monomer | MMA | 50 | — | 50 | 50 | 50 | 50 | 50 | 50 |
|  |  | EGDMA | 2.5 | 2.5 | 2.5 | 2.5 | 2.5 | 2.5 | 2.5 | 2.5 |
|  |  | TMPTA | — | — | — | — | — | — | — | — |
|  |  | St | — | 50 | — | — | — | — | — | — |
|  | Polymerizable phosphoric acid monomer | PM-21 | — | — | — | — | 0.2 | — | — | — |
|  |  | PP-70 | — | — | — | — | — | — | — | — |
|  | Polymerization initiator | ADVN | 0.5 | 0.5 | 0.5 | 0.5 | 0.5 | 0.5 | 0.5 | 0.5 |
|  |  | LPO | — | — | — | — | — | — | — | — |
|  | Small polymer particles | PMMA97 | — | — | 0.88 | — | 0.88 | — | — | — |
|  |  | PMMA40 | — | — | — | — | — | — | — | — |
|  |  | PS80 | — | — | — | 0.64 | — | — | — | — |
|  |  | PS39 | — | — | — | — | — | — | — | — |
|  |  | PS40 | — | — | — | — | — | — | — | — |
|  | Water-soluble cellulose compound | HPMC (65SH-50) | — | — | — | — | — | — | — | — |
|  |  | HPMC (65SH-400) | 0.09 | — | — | — | 0.09 | — | — | — |
|  |  | HPMC (65SH-4000) | — | 0.09 | — | — | — | — | — | — |
|  |  | NISSO HPC H | — | — | — | — | — | — | — | — |
|  | Dispersant | PVA (Gohsenol GL-05) | — | — | — | — | — | 1.95 | 1.95 | 1.95 |
| Measurement results | Small polymer particles | Volume-average particle size (μm) | — | — | 97 | 80 | 97 | — | — | — |
|  | Composite particles or polymer particles | Volume-average particle size (μm) | — | — | — | — | — | 20.1 | 8.1 | 5.5 |
|  |  | CV (%) | — | — | — | — | — | 46.0 | 43.0 | 41.1 |
|  |  | Specific surface area (m$^2$/g) | — | — | — | — | — | — | — | — |
|  |  | Added amount (g/m$^2$) | — | — | — | — | — | — | — | — |
|  |  | AE (KJ/kg) | — | — | — | — | — | 59.0 | 56.8 | — |

As shown in Tables 1 to 3, the production methods in Examples 1 to 17 of the present invention could cause droplets of the monomer mixture containing the polymerizable vinyl monomer to be dispersed in the aqueous medium in a stable state, owing to the presence of the small polymer particles on which the water-soluble cellulose compound had adsorbed. The resulting composite particles had uniform particle sizes (the coefficients of variation were 50% or lower).

The transmission electron microscope (TEM) image of a composite particle of Example 12 (FIG. 1) and the transmission electron microscope (TEM) image of a composite particle of Example 9 (FIG. 2) indicated that the production methods in Examples 1 to 17 of the present invention provided the composite particles in which the small polymer particles adhered to the surfaces of the large polymer particles. As confirmed by the TEM images in FIGS. 1 and 2, the production method in Example 12 provided composite particles in which the surfaces of the large polymer particles were partially covered with a layer made of the small polymer particles, and the production method in Example 9 provided composite particles in which the surfaces of the large polymer particles were entirely covered by a layer made of the small polymer particles.

Regarding the composite particles obtained in Example 12, the average particle size of the small polymer particles contained therein was obtained in the following manner. Namely, 10 small polymer particles were randomly selected in the TEM image in FIG. 1, and their particle sizes were obtained from the TEM image and averaged. According to this measurement based on the TEM image in FIG. 1, the average particle size of the small polymer particles contained in the composite particles in Example 12 was 44.1 nm, which was approximately 10% greater than the volume-average particle size, 40 nm, of the small polymer particles (the crosslinked polymethyl methacrylate particles) obtained in Preparation Example 2 and employed for the production of the composite particles in Example 9. Similarly, regarding the composite particles obtained in Example 9, the average particle size of the small polymer particles contained in the composite particles therein was obtained in the following manner. Namely, 10 small polymer particles were randomly selected in the TEM image in FIG. 2, and their particle sizes were obtained from the TEM image and averaged. According to this measurement based on the TEM image in FIG. 2, the average particle size of the small polymer particles contained in the composite particles in Example 9 was 43.7 nm, which was approximately 10% greater than the volume-average particle size, 39 nm, of the small polymer particles (the crosslinked polystyrene particles) obtained in Preparation Example 4 and employed for the production of the composite particles in Example 12. From these findings, regarding the composite particles produced by using the small polymer particles in Preparation Examples 1 to 5 (the small polymer particles having volume-average particle sizes between 39 and 97 nm), the particle size of the small polymer particles was assumed to be approximately between 39 and 110 nm, as determined by referring to the TEM images. Hence, the particle sizes of the small polymer particles contained in the composite particles in Examples 1 to 17 were confirmed to be in a range from 20 to 500 nm.

The production methods of Comparative Examples 1 to 5 could not allow droplets of the monomer mixture containing the polymerizable vinyl monomer to be dispersed in the aqueous medium in a stable state, and could not provide any particles.

As shown in Tables 1 to 3, the AEs (representing particle flowability) of the composite particles in Examples 1 to 17 of the present invention was in the range from 10 to 45 kJ/kg, which was better than the values of the spherical polymer particles in Comparative Examples 6 and 7. This is probably because, in the composite particles in Examples 1 to 17 of the present invention, the small polymer particles adhered to the surfaces of the large polymer particles, and made the surfaces of the composite particles uneven.

Example 18: Preparation Example of Optical Film

A coating agent was obtained by mixing: 30 g of the composite particles obtained in Example 1; 100 g of acrylic polyol (trade name: "Medium VM" manufactured by Dainichiseika Color & Chemicals Mfg. Co., Ltd., with 34 wt % solid resin content, solvent dispersion type) as the binder resin; and 30 g of isocyanate (trade name: VM-D, manufactured by Dainichiseika Color & Chemicals Mfg. Co., Ltd.) as the curing agent. After that, the obtained coating agent was applied, using an applicator, onto a polyester film having a thickness of 100 μm as a base material. The coated film was subjected to hot-air drying at 70° C. for 10 minutes to give an optical film. For this optical film, the total light transmittance, the haze and the gloss were measured. The results are shown in Table 4 below.

TABLE 4

| | Total Light Transmittance (%) | Haze (%) | Gloss |
|---|---|---|---|
| Example 18 | 83.62 | 96.52 | 10 |

[Method for Measuring Total Light Transmittance and Haze]

The haze and the total light transmittance of the optical film obtained in Example 18 were measured by a haze meter "NDH-4000" manufactured by NIPPON DENSHOKU INDUSTRIES CO., LTD. The total light transmittance was measured under JIS K 7361-1 test conditions, and the haze was measured under JIS K 7136 test conditions. Note that the haze and the total light transmittance shown in Table 4 are each an average value of the measured values of three measurement samples (number of measurement samples n=3). The haze value increases as the diffusibility of the light that transmits the optical film (transmitted light) increases.

[Method for Measuring Gloss]

The gloss of the optical film obtained in Example 18 was measured by a gloss checker (gloss meter) "IG-331" manufactured by HORIBA, Ltd. Specifically, the gloss of the optical film at 60° was measured by the gloss checker (gloss meter) "IG-331" in accordance with the method described in JIS Z 8741. The gloss value decreases as the diffusibility of the light reflected from the surface of the optical film (specifically, the surface of the coating film formed by application of the coating agent) increases, and a lower gloss value means a better flatting effect.

Example 19: Method for Manufacturing External Preparation (Body Lotion)

Body lotion was obtained by sufficiently mixing, by a mixer, the following: 3 parts by weight of the composite particles obtained in Example 2; 50 parts by weight of ethanol, 0.1 part by weight of glycyrrhizic acid; 0.5 part by weight of perfume; and 46.4 parts by weight of purified water.

The present invention can be embodied and practiced in other different forms without departing from the spirit and essential characteristics of the present invention. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

This application claims priority to Japanese Patent Application No. 2014-091668, filed Apr. 25, 2014. The contents of this application are incorporated herein by reference in their entirety.

INDUSTRIAL APPLICABILITY

The composite particles of the present invention may be applicable, for example, to: an additive (a flatting agent, a coating film softening agent, a texturing agent, or the like) to a coating agent (a coating composition) used as a coating material, a paper coating agent, a recording paper coating agent, or an optical member (e.g. optical film) coating agent; a light diffusing agent added to a light diffusive resin composition for producing a light diffuser (a lighting cover, a light diffusion plate, a light diffusion film, or the like); an anti-blocking agent for a film such as a food wrap film; and a material for an external preparation including an additive for cosmetics and other external preparations (an additive for improving lubricity, or for correcting skin defects such as freckles and wrinkles).

The invention claimed is:

1. A method for producing composite particles comprising an adsorbing step of causing a water-soluble cellulose compound to adsorb on surfaces of small polymer particles having a volume-average particle size of 20 to 500 nm and, following the adsorbing step, a polymerization step of subjecting a monomer mixture which contains a polymerizable vinyl monomer to aqueous suspension polymerization in a presence of the small polymer particles, thereby obtaining composite particles which contain the small polymer particles and large polymer particles greater than the small polymer particles.

2. The method for producing composite particles according to claim 1,
wherein the small polymer particles are made of a crosslinked polymer.

3. The method for producing composite particles according to claim 1,
wherein the small polymer particles are made of a polymer of a polymerizable vinyl monomer containing a hydrophilic monofunctional monomer.

4. The method for producing composite particles according to claim 1,
wherein the monomer mixture further contains at least one polymerizable phosphoric acid monomer represented by Formula (1) or Formula (2):

[Chemical Formula 1]

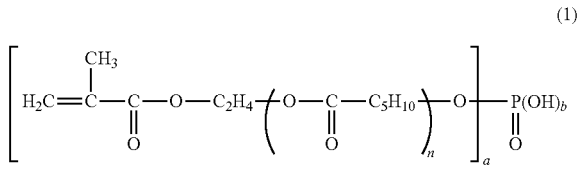

wherein n represents 1 to 5, and when a equals 1, b equals 2, while when a equals 2, b equals 1; or

[Chemical Formula 2]

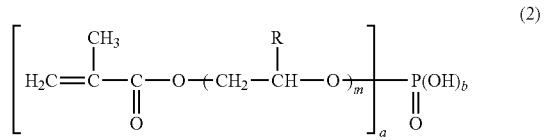

wherein R is hydrogen, a methyl group, or a chloromethyl group; m is 1 to 20; when a equals 1, b equals 2, while a equals 2, b equals 1.

5. The method for producing composite particles according to claim 1,
wherein at least one of hydroxypropyl cellulose and hydroxypropyl methylcellulose is used as the water-soluble cellulose compound.

6. The method for producing composite particles according to claim 1,
wherein, in the adsorption step, the water-soluble cellulose compound is caused to adsorb on the surfaces of the small polymer particles, in a state where the small polymer particles coexist with the water-soluble cellulose compound under a temperature condition where the water-soluble cellulose compound has a temperature of (T-15°) C. or higher, where T represents a lower critical solution temperature (° C.) or a cloud point (° C.) of the water-soluble cellulose compound.

7. The method for producing composite particles according to claim 1,
wherein an amount of the small polymer particles is from 0.010 to 0.15 g/m² per unit surface area of the composite particles.

8. Composite particles obtained by the method for producing composite particles according to claim 1,
wherein surfaces of the large polymer particles are at least partially covered by a layer made of the small polymer particles.

9. Composite particles comprising:
small polymer particles having a particle size of 20 to 500 nm on which a water-soluble cellulose compound is adsorbed; and
large polymer particles greater than the small polymer particles, and made of a polymer of a monomer mixture containing a polymerizable vinyl monomer,
the small polymer particles adhering to at least a part of surfaces of the large polymer particles.

10. The composite particles according to claim 9,
wherein the small polymer particles are made of a crosslinked polymer.

11. The composite particles according to claim 9,
wherein the monomer mixture further contains at least one polymerizable phosphoric acid monomer represented by Formula (1) or Formula (2):

[Chemical Formula 3]

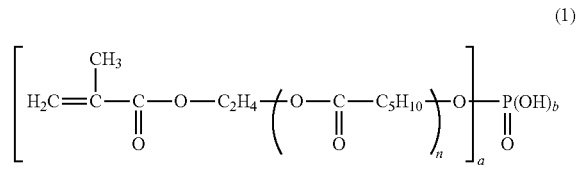

wherein n represents 1 to 5, and when a equals 1, b equals 2, while when a equals 2, b equals 1; or

[Chemical Formula 4]

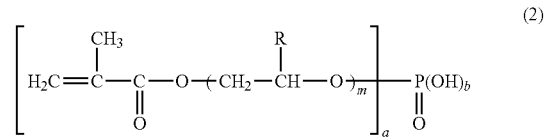

wherein R is hydrogen, a methyl group, or a chloromethyl group; m is 1 to 20; when a equals 1, b equals 2, while a equals 2, b equals 1.

12. The composite particles according to claim 9,
wherein the surfaces of the large polymer particles are at least partially covered by a layer made of the small polymer particles.

13. The composite particles according to claim 9, wherein a value of change in avalanche energy AE before and after an avalanche, representing particle flowability, is in a range from 10 to 45 kJ/kg.

14. An external preparation comprising the composite particles according to claim 9.

15. A coating agent comprising the composite particles according to claim 9.

16. An optical film obtainable by applying the coating agent according to claim 15 onto a base material.

17. A resin composition comprising the composite particles according to claim 9, and a base resin.

18. A molded product obtained by molding the resin composition according to claim 17.

19. Composite particles comprising:
 small polymer particles having a particle size of 20 to 500 nm;
 large polymer particles greater than the small polymer particles, and made of a polymer of a monomer mixture containing a polymerizable vinyl monomer, and
 a water-soluble cellulose compound,
 wherein a value of change in avalanche energy AE before and after an avalanche, representing particle flowability, is in a range from 10 to 45 kJ/kg,
 the small polymer particles adhering to surfaces of the large polymer particles.

20. An external preparation comprising the composite particles according to claim 19.

21. A coating agent comprising the composite particles according to claim 19.

* * * * *